United States Patent [19]

Stephens et al.

[11] Patent Number: 4,644,478

[45] Date of Patent: Feb. 17, 1987

[54] MONITORING AND ALARM SYSTEM FOR CUSTOM APPLICATIONS

[75] Inventors: Lawrence K. Stephens, Dallas; Robert B. Hayes, Houston, both of Tex.

[73] Assignee: International Business Machines Corp., Armonk, N.Y.

[21] Appl. No.: 531,650

[22] Filed: Sep. 13, 1983

[51] Int. Cl.[4] ...................... G06F 15/46; E21B 47/00; G08B 25/00

[52] U.S. Cl. .................................... 364/550; 340/506; 364/188

[58] Field of Search ................ 364/550, 900 MS File, 364/551, 478, 579, 580, 182, 422, 188; 340/713, 720, 723, 825, 36, 506, 870, 16, 525, 505, 511

[56] References Cited

U.S. PATENT DOCUMENTS

| | | | |
|---|---|---|---|
| 2,883,651 | 4/1959 | Akerlund | 364/550 X |
| 4,212,078 | 7/1980 | Games et al. | 364/900 |
| 4,296,409 | 10/1981 | Whitaker et al. | 364/551 X |
| 4,432,064 | 2/1984 | Barker et al. | 364/550 |
| 4,460,960 | 7/1984 | Anderson et al. | 364/900 X |

*Primary Examiner*—Felix D. Gruber
*Assistant Examiner*—H. R. Herndon
*Attorney, Agent, or Firm*—C. Lamont Whitham; James H. Barksdale

[57] ABSTRACT

A monitoring and alarm system of general purpose design can be customized for use with many different applications to provide sophisticated alarming and control functions based on logical relationships among several sensed variables. A central processing unit is connected to receive a plurality of inputs from various sensors, the variety and type of which are the choice of the user depending on the specific application to which the monitoring and alarm system is to be connected. The central processing unit is programmed to provide the user with an interactive display to first define the variables in the application and the states and/or limits of the variables. This action defines a logical group. Next, the user enters the alarm/action functions to be performed on the condition that all the conditions in the logical group are true. Once this interactive process has been completed, the central processing unit performs the alarm and control functions specified by the user.

7 Claims, 5 Drawing Figures

MONITORING AND ALARM SYSTEM FOR CUSTOM APPLICATIONS

CROSS-REFERENCE TO RELATED APPLICATIONS

The present application describes an invention which uses a schematic display generator that is the subject of application Ser. No. 499,458 filed May 31, 1983, entitled "Schematic Building Cursor Character" and a text placement scheme for graphics displays that is the subject of application Ser. No. 499,451 filed May 31, 1983, entitled "Text Placement on Graphics Screen", both of which applications were filed by Lawrence Keith Stephens and assigned to a common assignee with this application. Related to this application and filed concurrently herewith are application Ser. No. 531,774 entitled "Display for Monitoring and Alarm System" now U.S. Pat. No. 4,588,987 issued May 13, 1986, and application Ser. No. 531,651 entitled "Geometrical Display Generator", both also filed by Lawrence Keith Stephens and assigned to the same common assignee.

FIELD OF THE INVENTION

The present invention is in the field of monitoring and alarm systems, and more particularly, the invention is directed to such a system which can be customized by the end user to provide monitoring and alarm functions for a variety of applications.

BACKGROUND OF THE INVENTION

Monitoring and alarm systems are required for a wide variety of applications ranging from simple mechanisms to rather complex processes. An example of a simple mechanism requiring a monitoring and alarm system would be a home heating system, and an example of a complex process also requiring a monitoring and alarm system would be a petroleum cracking plant. In the past, the monitoring and alarm systems that have been provided for such diverse applications have been quite different reflecting the differing complexity of the applications. For example, a heating system might be equipped with a temperature sensor to monitor the plenum temperature of the furnace and a simple audio or visual alarm to provide an indication when a safe temperature is exceeded. In contrast, the petroleum cracking plant incorporates many processes that are mutually interdependent. Not only are temperatures at various points in the plant monitored, but flow rates, chemical constituents and various other variables are monitored. Some of the monitored variables may have single value set points or limits which, if exceeded, would constitute an alarm condition. More often, however, the variables being monitored are interdependent meaning that an alarm condition is not indicated unless a certain combination of variable values is detected.

The monitoring and alarm systems which have been developed for very complex applications are characterized by central processing units (CPU) connected to receive inputs from a plurality of sensors and to generate the appropriate alarms or other indications that may be required for the particular application. The CPU is programmed and otherwise adapted fo use in the specific environment. Since each installation is, in effect, a special purpose design, the monitoring and alarm systems for such complex applications are very expensive; however, the expense is justified by the relatively great cost of the application itself. There are on the other hand many applications which would be greatly improved by more sophisticated monitoring and alarm systems but for which the expense of such systems as presently designed cannot be justified.

SUMMARY OF THE INVENTION

It is therefore an object of the present invention to provide a monitoring and alarm system of general purpose design which can be customized for use with many different applications to provide sophisticated alarming and control functions based on logical relationships among several sensed variables.

It is another object of the subject invention to provide a monitoring and alarm system for custom applications that uses a CPU to not only monitor a plurality of variables and test their values against predetermined values, but also allow the end user to easily and readily adapt the system to a specific environment.

It is a further object of the invention to provide a CPU based monitoring and alarm system of general purpose design in which the end user can input the desired values and logical relationships for several sensed variables and the alarms and/or control actions to be provided for a particular application.

The foregoing and other objects of the invention are attained in a preferred embodiment by using a microcomputer as the CPU for the monitoring and alarm system. The microcomputer may be one of the popular personal or small business computers now on the market, but in the preferred embodiment, the microcomputer is the IBM Personal Computer. This microcomputer is connected to receive a plurality of inputs from various sensors, the variety and type of which are the choice of the end user depending on the specific application to which the monitoring and alarm system is to be connected. The microcomputer may also be connected to suitable audio and/or visual alarms or instead of or in addition to may be programmed to employ the built in speaker and/or the display monitor to provide the required alarm functions.

The microcomputer is programmed to provide the end user with a plurality of screens or menus to first allow the user to input data that defines the input variables. This is done by associating the variable names with the hardware addresses of the several sensors that provide inputs to the microcomputer. Next the end user is prompted to input data that determines the states, limits and logical groupings of the several variables being monitored. This allows a very flexible arrangement that allows the end user to customize a general purpose design to a specific end use environment. Moreover, it is possible to easily modify the system by adding or removing sensors or by changing the states, limits and logical groupings of the variables being monitored without expensive modifications or reprogramming. When a logical group has been defined, then on the basis of all the conditions defined by the logical group being true, the microcomputer is programmed to perform the alarm and control functions which are also determined by the end user by inputing data in response to screen prompts.

BRIEF DESCRIPTION OF THE DRAWINGS

The objects of the invention as well as other aspects and advantages thereof will be better understood from the following detailed description of the invention with reference to the accompanying drawings, in which.

DETAILED DESCRIPTION OF THE INVENTION

Figure 1:
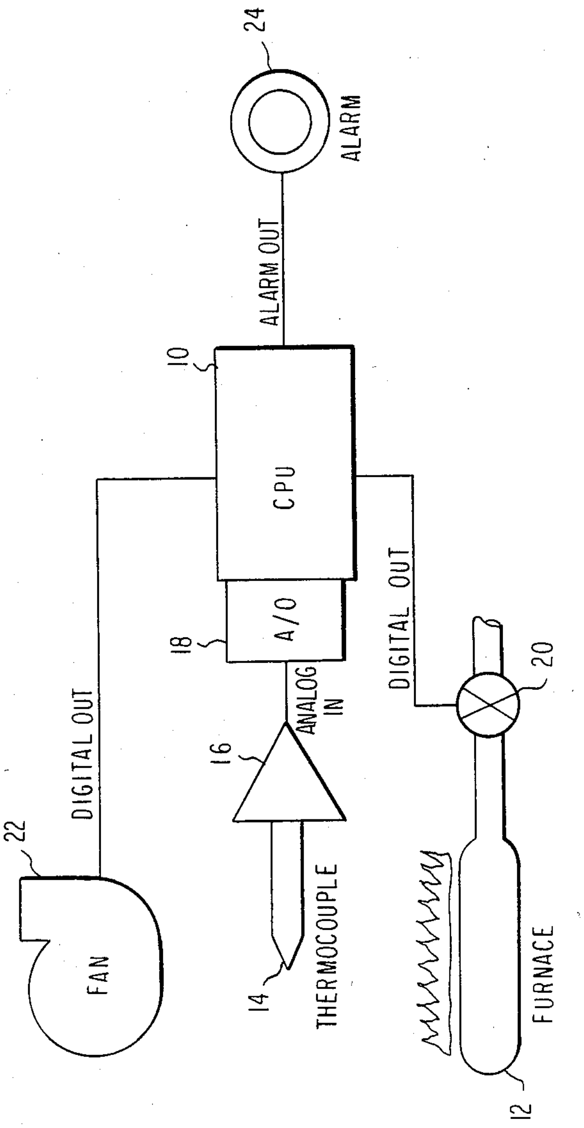
FIG. 1 is a block diagram of a simple furnace control system used as a pedagogical example of the operation of the invention.

Referring now to the drawings and more particularly to FIG. 1, there is shown a simple furnace control system which illustrates the basic principles of the subject invention. A host computer 10 is the principle monitoring and control element. In the preferred embodiment, the host computer 10 is an IBM Personal Computer or similar microcomputer, and as will become clear in the following description, the host computer 10 is programmed to permit the user to customize the monitoring and control functions of the computer for the specific application and environment. In this simple example, a furnace burner 12 is operational to generate heat, and a thermocouple 14 is responsive to the heat generated and produces an electrical signal which is amplified by amplifier 16. The output of amplifier 16 is connected to one input of the host computer 10 by means of an appropriate analog-to-digital interface 18. The signal from the amplifier 16 is referred to as an "analog in" signal because the signal may vary over a range of values. For example, the "analog in" signal from amplifier 16 may represent thermocouple temperatures in the range of −120° to +120° Fahrenheit. In contrast a "digital in" signal would have either an on or off value. Similarly, a "digital out" signal may be turned on or off by a software transaction initiated at the host computer 10. Thus, a "digital in" or a "digital out" signal represent a single bit of information which may be in either the 0 or the 1 state. In FIG. 1, there are three "digital out" signals from the host computer 10. One is supplied to a valve 20 that is operative to turn the burner 12 either on or off. A second is supplied to the fan 22 to turn it either on or off. The third is supplied to the alarm 24 to activate it.

The first operation that must be performed by the user of the subject invention is to define the variables of the system that is being monitored and controlled. This process may be characterized as creating a strategy of control and is accomplished by associating variable names with sensor hardware addresses. This is facilitated with a series of screens or menus which are generated by any well known display manager utility. The first of these is illustrated below:

| | | | |
|---|---|---|---|
| VARD | | VARIABLE DEFINITION | |
| Variable Name | | [FURNONOF] | |
| Cluster Number | 0–7 | [0] | Sensor Type AI,DO,DI,TI [DO] |
| Port | | [1 ] | |
| Bit | 0–7 | [1] | |

-continued

| | | | |
|---|---|---|---|
| Zero Status | [OFF ] | | |
| One Status | [ON ] | | |
| Messages - Press appropriate function key when all fields are filled in. | | | |
| F1 = Delete | F2 = File | F3 = Quit | F4 = Reset |

In the screen illustrated above, the brackets indicate the locations of user inputs which are typically made by means of a keyboard that is part of the host computer 10. This convention is common to many well known programs requiring data input from the user. In this specific screen, a "digital out" is defined. The variable's hardware address is cluster 0, port 1 and bit 1. Note that the sensor type is specified as DO meaning that it is a "digital out". Obviously, AI stands for analog in and DI stands for "digital in". Not previously mentioned, however, is TI which stands for "Timer". This is another type of input to the host computer that allows the user flexibility in deciding whether a delay should be built into the alarm. When the variable defined by the illustrated screen is in the zero state, the message "OFF" will appear on any screen for which this variable is defined. This particular variable is assigned the eight character name "FURNONOF". The name was chosen to reflect the ability to turn the furnace on or off.

The second variable defined is "COOLONOF". As the name suggests, this variable is a "digital out" employed to turn the fan 22 on and off. The definition for it is found in the screen illustrated below:

| | | | |
|---|---|---|---|
| VARD | | VARIABLE DEFINITION | |
| Variable Name | | [COOLONOF] | |
| Cluster Number | 0–7 | [0] | Sensor Type AI,DO,DI,TI [DO] |
| Port | | [1 ] | |
| Bit | 0–7 | [0] | |
| Zero Status | | [OFF ] | |
| One Status | | [ON ] | |
| Messages - Press appropriate function key when all fields are filled in. | | | |
| F1 = Delete | F2 = File | F3 = Quit | F4 = Reset |

The variable "COOLONOF" has a hardware address of cluster number 0, port 1 and bit 0. It is also a "digital out" as indicated by the sensor type DO.

The third variable to be defined is "SETALARM". As the name suggests, this variable has the purpose of turning the alarm 24 on and off. It is also a digital out, and it is defined by the screen shown below:

| | | | |
|---|---|---|---|
| VARD | | VARIABLE DEFINITION | |
| Variable Name | | [SETALARM] | |
| Cluster Number | 0–7 | [0] | Sensor Type AI,DO,DI,TI [DO] |
| Port | | [1 ] | |
| Bit | 0–7 | [2] | |
| Zero Status | | [OFF ] | |
| One Status | | [ON ] | |
| Messages - Press appropriate function key when all fields are filled in. | | | |
| F1 = Delete | F2 = File | F3 = Quit | F4 = Reset |

The fourth variable defined is "FURNTEMP". It represents the analog in coming from the thermocouple 14. The limits associated with "FURNTEMP" and its addressing information are contained in the screen illustrated below:

| | |
|---|---|
| VARD | VARIABLE DEFINITION |

-continued

| | | |
|---|---|---|
| Variable Name | [FURNTEMP] | |
| Cluster Number 0–7 | [0] Sensor Type AI,DO,DI,TI [AI] | |
| Channel | [1 ] | |
| Engineering Units | [DEGF] | |
| Alarm Dead Band | [10 ] | Zero Entries in both |
| Low Alarm Limit | [70 ] | Eng. Unit Fields |
| High Alarm Limit | [180 ] | assumes input in Eng. |
| Rate of Change Limit | [10 ] | Units |
| Low Warning Limit | [168 ] | Zero Eng. U. [0 ] |
| High Warning Limit | [170 ] | Full Scale [0 ] |

Messages - Press appropriate function key when all fields are filled in.
F1 = Delete F2 = File F3 = Quit F4 = Reset The fifth variable defined is "FURN1". This variable represents an "analog in" whose value is obtained by a conversion algorithm defined at file definition time. The conversion information is displayed in the <Zero in Eng. Unit> field and the <Full Scale in Eng. Unit> field. The values in this example are −17.777 and 37.7777. They facilitate the conversion of a value 0–100% full scale to a value in engineering units. In this specific case, a value in degrees Fahrenheit is converted to degrees Celcius. The addressing and limit information for the variable are shown in the screen below:

| VARD | VARIABLE DEFINITION | |
|---|---|---|
| Variable Name | [FURN1 ] | |
| Cluster Number 0–7 | [0] Sensor Type AI,DO,DI,TI [AI] | |
| Channel | [1 ] | |
| Engineering Units | [DEGC] | |
| Alarm Dead Band | [10 ] | Zero Entries in both |
| Low Alarm Limit | [0 ] | Eng. Unit Fields |
| High Alarm Limit | [200 ] | assumes input in Eng. |
| Rate of Change Limit | [10 ] | Units |
| Low Warning Limit | [20 ] | Zero Eng. U.[−17.777] |
| High Warning Limit | [100 ] | Full Scale [37.7777] |

Messages - Press appropriate function key when all fields are filled in.
F1 = Delete F2 = File F3 = Quit F4 = Reset The next step in defining the control strategy employed is to create the logical groupings of the defined variables. The screen shown below shows the name of the alarm/action definition (logical group) which, for this example, is "BOCA":

ACTN ALARM/ACTION DEFINITION
Action Name [BOCA ]

-continued

Messages - Fill in the action name or F9 for rotate
and press - F1 = Del F2 = File F3 = Quit
F4 = Reset F7 = Bck F8 = For F9 = Rotate The screen shown below shows the single variable "FURNTEMP" and the state of interest for the control logic:

ACTN ALARM/ACTION DEFINITION

| VARIABLE NAME | | ANALOG or DI | | | | | DIGITAL | |
|---|---|---|---|---|---|---|---|---|
| | HIAL | HIWA | RCHG | LOWA | LOAL | | ZERO | ONE |
| (1) [FURNTEMP] | | 170 | | | | | | |
| (2) [ ] | | | | | | | | |
| (3) [ ] | | | | | | | | |
| (4) [ ] | | | | | | | | |
| (5) [ ] | | | | | | | | |
| (6) [ ] | | | | | | | | |
| (7) [ ] | | | | | | | | |
| (8) [ ] | | | | | | | | |
| (9) [ ] | | | | | | | | |
| (10) [ ] | | | | | | | | |
| (11) [ ] | | | | | | | | |
| (12) [ ] | | | | | | | | |
| (13) [ ] | | | | | | | | |
| (14) [ ] | | | | | | | | |
| (15) [ ] | | | | | | | | |

Messages - Fill in the variable name or F9 for rotate
and press - F1 = Del F2 = File F3 = Quit
F4 = Reset F7 = Bck F8 = For F9 = Rotate As shown in this screen, the state is in the high warning condition at 170° F. When "FURNTEMP" is in high warning, the alarm and action definitions outlined in the following two screens will occur:

ACTN ALARM/ACTION DEFINITION
MESSAGE TO APPEAR ON USER DEFINED SCREEN
[FURNACE ON/OFF CONTROL ]
MESSAGE TO APPEAR ON THE
BOTTOM OF THE SCREEN
[***FURNACE TOO HOT, CALL SUPERVISOR. ]
NAME OF THE NEW SCREEN TO APPEAR: [SIMULATE]
EVENT HISTORY ENTRY Y/N [N]
ALARM FUNCTION Y/N [Y]
AUDIBLE ALARM 1 = SHORT 2 =
UNTIL ACKNOWLEDGED [1]
RESET TIMER [ ] START TIMER [ ]
Messages - Fill in the message and press
F1 = Del F2 = File F3 = Quit F4 = Reset
F7 = Bck F8 = For F9 = Rotate

ACTN ALARM/ACTION DEFINITION

| VARIABLE NAME | DIGITAL OUT STATUS ZERO | ONE ON |
|---|---|---|
| (1) [COOLONOF] | | |
| (2) [ ] | | |
| (3) [ ] | | |
| (4) [ ] | | |
| (5) [ ] | | |
| (6) [ ] | | |
| (7) [ ] | | |
| (8) [ ] | | |

Messages - Fill in the Digital Out, or F9 for rotate
and Press - F1 = Del F2 = File F3 = Quit
F4 = Reset F7 = Bck F8 = For F9 = Rotate In the first of the above two screens, the first item is the <Message to Appear on User Defined Screen>. The message appears when the logical group becomes true and remains until the logical group becomes not true. The next item is the <Message to Appear on the Bottom of the Screend>. This message appears on the bottom of the display when the logical group becomes true. The message is also logged to the printer and time and date stamped. The next item defines the new display to appear when the logical group becomes true. The next item says that no record is to be written to the event history file. The next item says that this logical group is an alarmable function. That implies that any alarm area on a dynamic display that is linked to this logical group will blink red, for example, when the logical group becomes true. It also implies that a record will be written to the alarm file when the logical group becomes true, when the alarm is responded to, and when the logical group is no longer true. The next entry is the audible alarm entry. By putting a 1 in the blank, a short audible alarm will occur when the logical group becomes true. The next two entries are blank because no timer is involved in this strategy. In the next screen, the digital outs and their states are defined for this logical group. When the logical group becomes true, these digital outs will be set if they are not already in the specified states. The purpose of this logical group is to set an alarm on the screen and turn on the fan whenever the furnace gets too warm.

Another alarm/action (logical) group is defined to turn on the furnace initially and turn off the fan when the furnace gets too cold. Its name is BOCA1 in this example. In the screen shown below, the name of the alarm/action (logical) group is inserted by the user:

```
ACTN          ALARM/ACTION DEFINITION
                  Action Name [BOCA1  ]
Messages - Fill in the action name or F9 for rotate
and press - F1 = Del   F2 = File   F3 = Quit
F4 = Reset   F7 = Bck   F8 = For   F9 = Rotate
```

The next screen shows the single variable FURNTEMP and the state of interest for the control logic, which in this case is the low warning condition. This screen is shown below:

```
ACTN                        ALARM/ACTION DEFINITION
VARIABLE NAME                   ANALOG or DI                DIGITAL
                  HIAL HIWA RCHG LOAL          LOWA    ZERO  ONE
(1)   [FURNTEMP]                               168
(2)   [          ]
(3)   [          ]
(4)   [          ]
(5)   [          ]
(6)   [          ]
(7)   [          ]
(8)   [          ]
(9)   [          ]
(10)  [          ]
(11)  [          ]
(12)  [          ]
(13)  [          ]
(14)  [          ]
(15)  [          ]
Messages - Fill in the variable name or F9 for rotate
and press - F1 = Del   F2 = File   F3 = Quit
F4 = Reset   F7 = Bck   F8 = For   F9 = Rotate
```

When FURNTEMP is in low warning, the alarm and action definitions shown in the next two screens will appear. In the first of these screens shown below, the first item is again the <Message to Appear on User Defined Screen>. The message appears when the logical group becomes true and remains until the logical group becomes not true. The next item is the <Message to Appear at the Bottom of the Screen>. This message appears on the bottom of the display when the logical group becomes true and is also logged to the printer and time and data stamped. The next item defines the new display to appear when the logical group becomes true and so forth as before:

```
ACTN          ALARM/ACTION DEFINITION
MESSAGE TO APPEAR ON USER DEFINED SCREEN
[                                                    ]
MESSAGE TO APPEAR ON THE BOTTOM OF THE SCREEN
[                                                    ]
NAME OF NEW SCREEN TO APPEAR:              [          ]
EVENT HISTORY ENTRY Y/N [N]
ALARM FUNCTION Y/N [N]
AUDIBLE ALARM 1 = SHORT 2 =
UNTIL ACKNOWLEDGED [1]
RESET TIMER [               ] START TIMER  [          ]
Messages - Fill in the message and press - F1 = Del
F2 = File    F3 =    F4 = Reset    F7 = Bck    F8 = For
F9 = Rotate   Quit
```

In the next screen, the "digital outs" and their states are defined for this logical group:

```
ACTN                ALARM/ACTION DEFINITION
VARIABLE NAME          DIGITAL OUT STATUS ZERO ONE
(1)   [FURNONOF]                                 ON
(2)   [COOLONOF]                           OFF
(3)   [          ]
(4)   [          ]
(5)   [          ]
(6)   [          ]
(7)   [          ]
(8)   [          ]
Messages - Fill in the Digital Out, or F9 for rotate
and press - F1 = Del   F2 = File   F3 = Quit
F4 = Reset   F7 = Bck   F8 = For   F9 = Rotate
```

Figure 2:
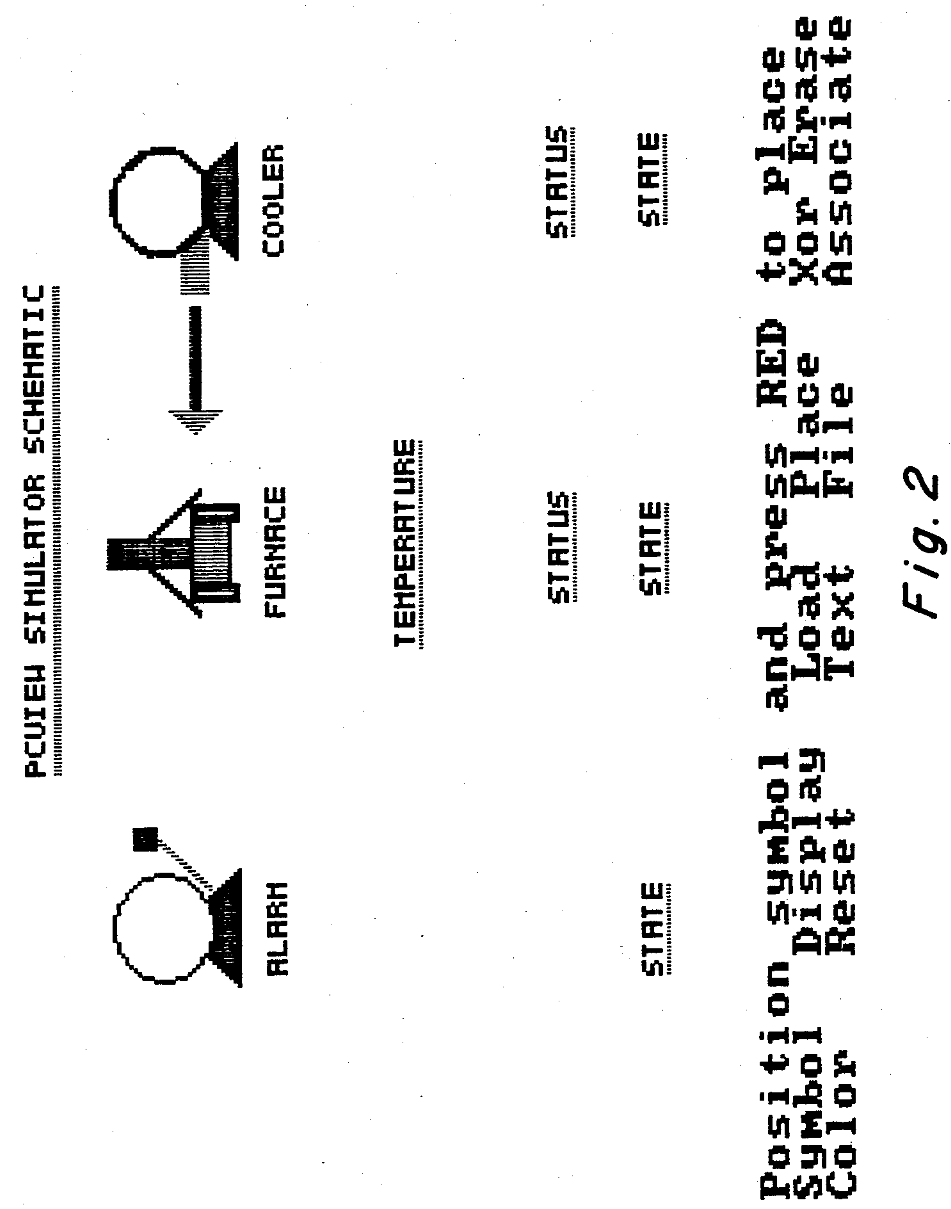
FIG. 2 is an illustration of a schematic display for the pedagogical example of FIG. 1.

As part of the customization process, the user generates a schematic display of the process to which the monitoring and alarm system is being applied. The preferred method of generating the schematic display is disclosed in application Ser. No. 499,458 entitled "Schematic Building Cursor Character". Text is added to this display according to the technique described in application Ser. No. 499,451 entitled "Text Placement on Graphics Screen". For the specific example being described, the schematic display is quite simple as shown in FIG. 2. The symbol labeled "Alarm" corresponds to alarm 24 shown in FIG. 1. Similarly, the symbol labeled "Furnace" corresponds to the furnace including burner 12, and the symbol labeled "Cooler" corresponds to the fan 22. The steps involved in creating the schematic display of FIG. 2 are as follows:

(1) Place all the primary symbols on the screen in the locations desired.
(2) Position the text strings in the appropriate locations.
(3) Underline any locations of primary importance.
(4) Link all alarm/action definitions and variables with the areas designated for them on the screen.
(5) File the schematic away under a name of the user's choice. In the specific example being described, the name chose was "Simulate".
(6) Press function key F3 to signify the completion of the schematic generation process.

The screen shown below is an example of a screen that allows the user to select the desired dynamic display:

| DSEL | DISPLAY MENU |
|---|---|
| Name | Description |
| WHOLE | This is an example of logical groupings. |
| NEW | |
| MANUAL | This is an example of a manual override. |
| SIMULATE | This is the furnace on/off control screen. |

Figure 3:
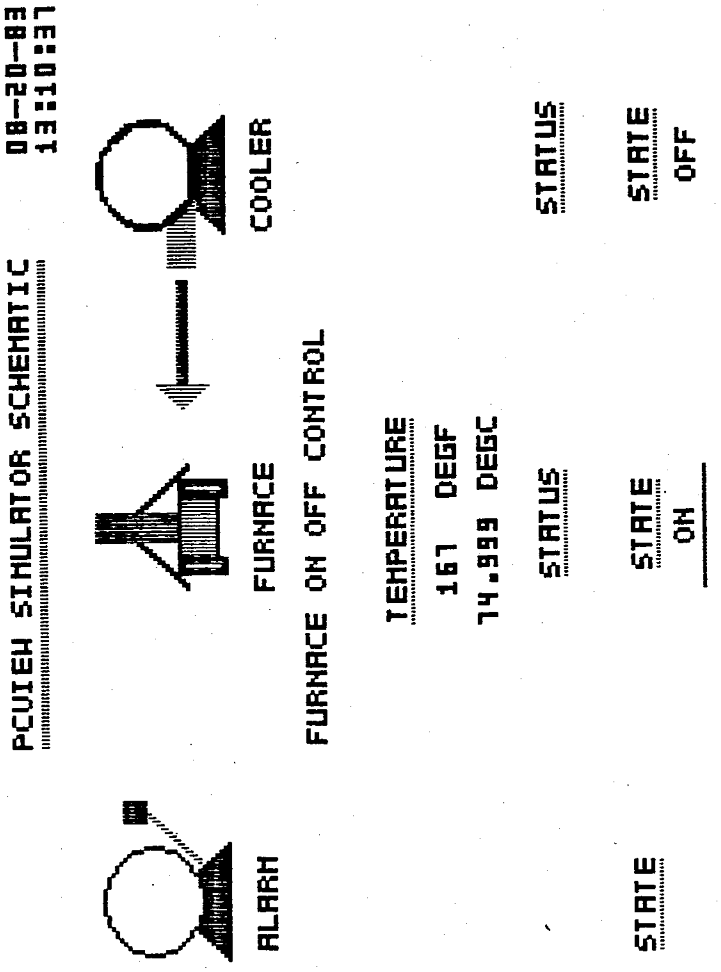
FIG. 3 is an illustration of the initial schematic display showing temperature and state conditions of the furnace and state condition of the cooler or fan for the pedagogical example of FIG. 1.
Figure 4:
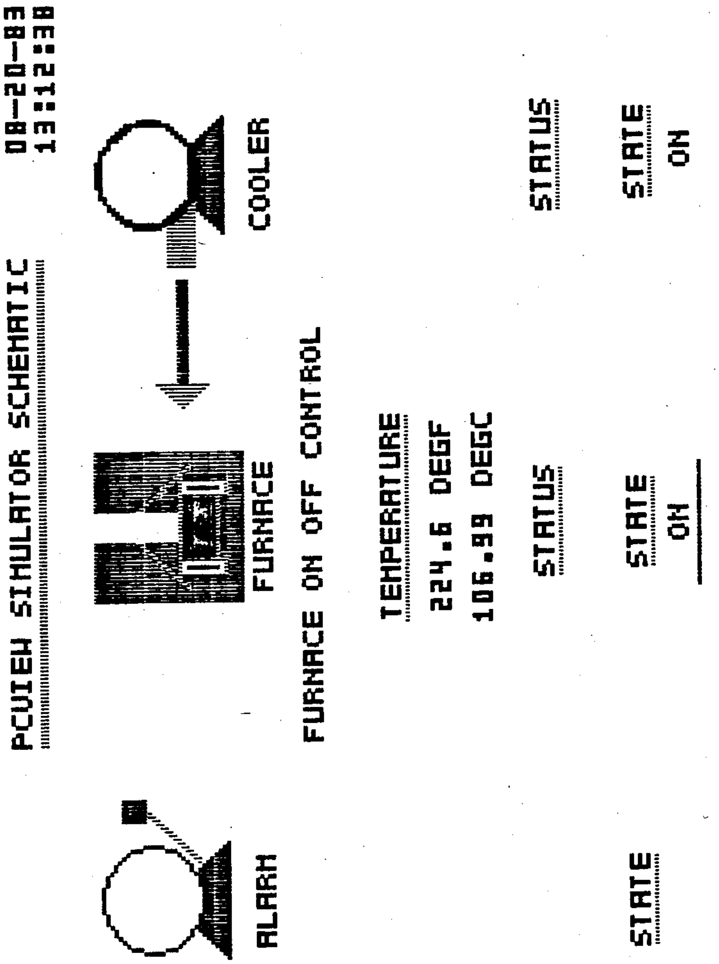
FIG. 4 is an illustration of the schematic display showing the furnace in an alarm condition as well as the temperature and state condition of the furnace and the state condition of the cooler or fan for the pedagogical example of FIG. 1.

Assuming that "Whole" is selected, FIG. 3 shows the dynamic display initially. FIG. 4 shows the display after the alarm/action (logical) group BOCA becomes true and the new display "Simulate" is invoked. In FIG. 4, the furnace is shown in alarm. The logical group also turned on the fan to cool down the furnace. As the fan cools the furnace, it will cause the temperature to approach the low warning state. When this occurs, the fan is turned off as a result of the logical group BOCA1 becoming true.

Figure 5:
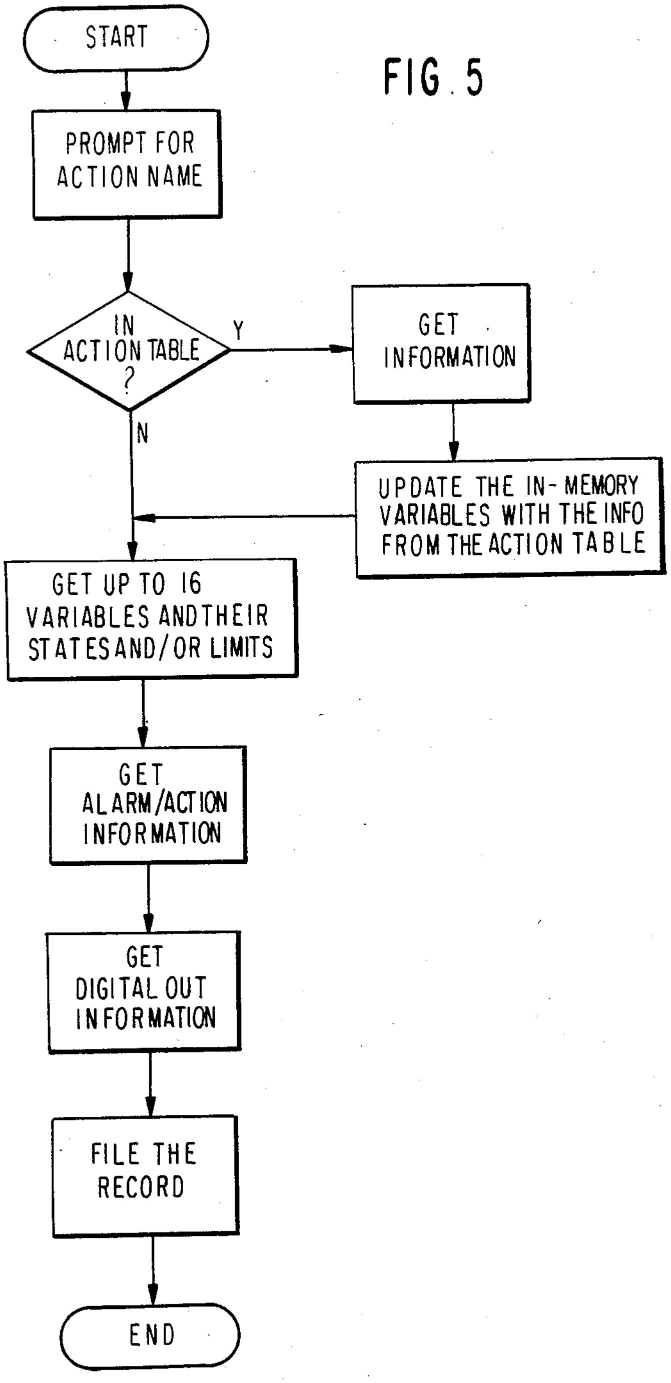
FIG. 5 is a flow chart summarizing the process of making the logical groupings according to the invention.

The simple example just described demonstrates the basic operation and principles of a preferred embodiment of the subject invention. The flow chart shown in FIG. 5 illustrates the process. Briefly summarizing, the system performs the function of monitoring and comparing values to limits, changes of states, elapsed time and combinations of these. The limits consist of user defined low alarm limits, low warning limits, rate of change limit, high alarm limit and high warning limit. The states consist of a "digital in" or "digital out" being in the logical one or zero state. Timer variables are provided to allow the user to define strategies based on time. Monitoring consists of acquiring the value of each variable on a user defined frequency and a system defined phase. The values are compared to limits or states, and a bit mask is set to note the current state of each variable in the system. Users will define limits and the frequency at which the variable is scanned during variable definition. Alarm definition is accomplished by linking up to 16 variables and a state or limit for each variable to a specific action/alarm name. Also linked to this name is the action to be taken when all the states are true. The actions (alarms) can include any or all of the following:

(1) Setting up to 8 "digital outs" to a user defined value.
(2) Blinking an area on the screen in a user defined color.
(3) Replacing the current display with a user defined display.
(4) Putting a message on the user's display.
(5) Displaying an alarm message.
(6) Writing a record to the event file.
(7) Sounding the horn on the Personal Computer.
(8) Resetting a timer variable.
(9) Starting a timer variable.

The logical grouping function of the invention is performed by first employing a display manager to retrieve data from the user. The display manager is not a part of the invention and could be any commercially available product similar to SPF or CICS. The data items input by the user include the following:

(1) At least one and up to 15 variables and their states.
(2) A message to display on a schematic.
(3) An alarm message.
(4) Another dislay name.
(5) Whether a record should be written to the event history file.
(6) Whether a record should be written to the alarm history file.
(7) Whether an audible alarm should be sounded for a short time, until acknowledged, or never.
(8) Whether a timer variable should be reset.
(9) Whether a timer variable should be started.
(10) Up to 8 "digital outs".

When logical groupings is initially invoked, the old alarm/action file's first record is acquired. The first two bytes of the record contain the number of records in the file. The second two bytes contain the last entry number used in the file. Total records is set equal to the number of records in the file, and Oldentry is set equal to the last entry number used.

The data items are collected interactively by the user filling in the blanks of successive screens. The first screen of data is a prompt for the alarm/action name. The user enters a name consisting of 8 alpha-numeric characters. The alarm/action file is searched for the entry. If the entry exists in the file, the items previously entered are retained as the current items to be edited. If the entry does not exist, the current items are blanked out and the name is used as a new entry. One function key is a dedicated rotate key. This key enables the user to display each alarm/action name in the prompt field one-at-a-time.

After a name is entered, the second screen is displayed with the contents of the current items. If the current items are blanks, then all data fields on the second screen are blank. The user must enter at least one variable name and choose the state or alarm limit of interest. Additionally, the user may choose up to 14 other variables and their states or limits. The way the user enters a variable state combination is to enter the variable name or use the rotate key to rotate through all the valid variable names from the variable file. When a valid variable is entered, the 5 limits will appear under their categories or the two digital states will appear. The user can use the tab key to select a state, differentiation of the selected state or limit is achieved by reverse-video display of the selected time or state. When the state or limit of interest is selected, the user presses the enter key to signify choice. The entry number in the variable file for the variable selected is then ORed with the state or limit fo form the logic entry for the alarm/action entry. The masks are as follows: Hex 8000 for High Alarm, Hex 4000 for High Warning, Hex 2000 for rate of change, Hex 1000 for Low Alarm, Hex 800 for Low Warning, Hex 8000 for digital status of on or timer elapsed, and Hex 4000 for digital status off or timer reset.

When the user has completed his/her selection of the variables and their states, the user is then prompted to save the entries. The user can press function keys F2 or F8 to save the entries in a memory resident data base. At that point, the third screen of information is presented to the user.

The third screen first prompts the user for a message to appear on the user defined screen and a message to appear on the bottom of the screen. If entered, these are stored in the memory resident data base; otherwise, a null entry is stored. The next entry is for a new screen to appear. All new screens must have a unique file type of ".ddt"; therefore, checking can be done to assure the user's entry is a valid new screen. If a screen's name is entered, the name is stored in the memory resident data base; otherwise, a null entry is saved. The next entry is the event history entry. This field calls for a "Y" or "N" entry. A default of "N" is assumed. This entry determines whether a record is written to the event history file whenever the logical group becomes true. The next entry is the alarmable function entry. It is also a "Y" or a "N" field. A default of "N" is assumed. This entry determines whether alarm records should be written to the alarm history file for the logical group. If a "Y" is entered, a record will be written whenever the logical group becomes true, is acknowledged, and becomes not true. The next entry is the audible alarm field. A "1" in this field signifies a single beep whenever the logical group is true, a "2" signifies a continual beeping until acknowledgement of the alarm, and a blank entry signifies no beep is to occur. The final two entries are the reset and start timer entries. These entries are timer variable names. The reset timer allows a timer variable to be reset on the occurance of a logical group becoming true. The start time allows a timer variable to be started on the basis of a logical group becoming true. Both of these entries are checked by searching the variable file to determine if the name entered is an actual timer variable. After all the entries have been filled out properly, the user is prompted to save the entries. This is accomplished by pressing either of the function keys F2 or F8. When the user presses F2 or F8, the next screen is presented.

The fourth screen of data presents the user with 8 blank variable name slots. The user is prompted to fill-in-the-blanks with "digital outs". Up to eight "digital outs" and their states may be specified for control action in the event of the logical group becoming true. When a user enters a variable name, the variable file is searched to verify the name being a "digital out". If it is, the zero state name and the one state name are obtained from the name file through pointers contained in the variable file record for the "digital out". The state names are then displayed on the screen under their titles. The user can tab between the two entries to select the state of his/her choice. After the desired choice is displayed in reverse-video, the user can press the enter key to signify selection and if the zero state name is selected, the variable file entry number is ORed with Hex 4000. If on the other hand the one state is selected, the variable file entry is ORed with Hex 8000. The modified entry number is the stored in the memory resident data base. This process continues until the user presses function key F2 to save the alarm/action entry.

When the function key F2 is pressed on the final page, the memory resident data base is transformed into a record to be entered into the alarm/action file. The memory resident data base consists of an 8 byte alarm/action name, a 32 byte array containing the logic entries, two 39 byte message fields, an 8 byte screen field, a two byte event history field, a two byte alarm field, a two byte audible alarm field, a two byte reset timer field, a two byte start timer field, and an 18 byte "digital out" array. If the user entries are an update of an already existing logical group, the entries go into the existing record in the alarm/action file. If not, a search of the alarm/action file is made to find a free record (designated by a −1 in the entry field). Oldentry is then incremented and the empty records entry number is set equal to Oldentry. Each logic entry is then entered into the record. Then the user defined screen message is entered into the message file and a pointer to the message file record is saved in the alarm/action file. If no message was entered by the user, a "−1" is entered as the pointer value. The Bottom of the screen message is handled the same way. The full screen name is entered into the name file and a pointer to the name record is entered into the alarm/action file. The entries for event history field, alarm field and the audible alarm field are put into the record, then the reset timer entry and the start timer, and finally the 8 "digital out" entries are inserted into the record. Then, the record is written to the alarm/action file, the memory data base is initialized and the first screen is presented to the user.

Whenever the user selects the function key F3 to end the program, the alarm/action file is cleaned-up. This process consists of searching the alarm/action file for any entry numbers not equal to "−1" and putting the entries at the front of the file starting with the second record. Then, the number of records is entered in the first two bytes of the first entry, and the last entry nyumber used is entered in the second two bytes of the first record.

The following is a description of the files used in the preferred embodiment of the invention:

(1) Variable file (varfile.tab):
  (a) The first record of the variable file has two entries. The first two bytes is the number of records contained in the file. The second two bytes contain the largest entry number used.
  (b) Each record after the first record have one of two formats. Differentiation of format is accomplished by the type entry which occurs in the same location of each format.
  Type 1 (Analog In) has a format as given below:

| | Name of Field | Description |
|---|---|---|
| (1) | SENSEUP$: | 2 byte integer field containing the type. |
| (2) | VARUP$: | 8 byte character field containing the variable name. |
| (3) | CLUSTERUP$: | 2 byte integer field containing the cluster the variable is in. |
| (4) | ET$: | 2 byte integer field containing the entry number for the record. |
| (5) | CHANNELUP$: | 2 byte integer field containing the analog channel the "analog in" should come from. |
| (6) | ENGUP$: | 2 byte integer field containing the pointer to the engineering units file record for the "analog in". |
| (7) | DEADUP$: | 4 byte single precision real value containing the alarming dead band. |
| (8) | LOWUP$: | 4 byte single precision real value containing the low alarm limit. |
| (9) | HLUP$: | 4 byte single precision real value containing the high alarm limit. |
| (10) | ROCUP$: | 4 byte single precision real value containing the rate of |

-continued

| | | |
|---|---|---|
| | | change alarm limit. |
| (11) | LWLUP$: | 4 byte single precision real value containing the low warning limit. |
| (12) | HWLUP$: | 4 byte single precision real value containing the high warning limit. |
| (13) | ZENGUP$: | 4 byte single precision real value containing the zero value in engineering units. |
| (14) | FENGUP$: | 4 byte single precision real value containing the full value in engineering units. |
| (15) | RATIO$: | 4 byte single precision real value containing the ratio to be employed in converting to engineering units. |
| (16) | FILLA$: | 10 byte filler for future expansion. |

Type 2, 3 and 4 (Digital In, Digital Out and Timer) have a format as given below:

| | Name of Field | Description |
|---|---|---|
| (1) | SENSEUP$: | 2 byte integer field containing the type. |
| (2) | VARUP$: | 8 byte character field containing the variable name. |
| (3) | CLUSTERUP$: | 2 byte integer field containing the cluster the variable is in. |
| (4) | ET$: | 2 byte integer field containing the entry number for the record. |
| (5) | PORTUP$: | 2 byte integer field containing the Digital Port the "digital in" should come from or the time in seconds for the timer. |
| (6) | BITUP$: | 2 byte integer field containing the bit of interest for a "digital in" or a "digital out". |
| (7) | ZEROSUP$: | 2 byte integer field containing a pointer to the name file for the record containing the message. |
| (8) | ONESUP$: | 2 byte integer field containing a pointer to the name file for the record containing the message. |
| (9) | FILLD$: | 42 byte filler for future expansion. |

(2) Alarm/Action file (scrfile.tab):

(a) The first record of the Alarm/Action file has two entries. The first two bytes is the number of records contained in the file. The second two bytes contain the largest entry number used.

(b) Each record after the first record has the following:

| | Name of Field | Description |
|---|---|---|
| (1) | A$: | 2 byte integer field containing the entry number for the record. |
| (2) | B$: | 8 byte character field containing the Alarm/Action name. |
| (3) | C$: | 2 byte integer field containing the first logical entry. |
| (4) | D$: | 2 byte integer field containing the second logical entry. |
| (5) | E$: | 2 byte integer field containing the third logical entry. |
| (6) | F$: | 2 byte integer field containing the fourth logical entry. |
| (7) | G$: | 2 byte integer field containing the fifth logical entry. |
| (8) | H$: | 2 byte integer field containing the sixth logical entry. |
| (9) | I$: | 2 byte integer field containing the seventh logical entry. |
| (10) | J$: | 2 byte integer field containing the eighth logical entry. |
| (11) | K$: | 2 byte integer field containing the ninth logical entry. |
| (12) | L$: | 2 byte integer field containing the tenth logical entry. |
| (13) | M$: | 2 byte integer field containing the eleventh logical entry. |
| (14) | N$: | 2 byte integer field containing the twelfth logical entry. |
| (15) | O$: | 2 byte integer field containing the thirteenth logical entry. |
| (16) | P$: | 2 byte integer field containing the fourteenth logical entry. |
| (17) | Q$: | 2 byte integer field containing the fifteenth logical entry. |
| (18) | R$: | 2 byte integer field containing the pointer to the message file entry for the user's screen image. |
| (19) | S$: | 2 byte integer field containing the pointer to the message file entry for the alarm message. |
| (20) | T$: | 2 byte integer field containing the pointer to the name file for the new screen name. |
| (21) | T$: | 2 byte integer field containing the event history file entry specifier. |
| (22) | U$: | 2 byte integer field containing the alarmable function specifier. |
| (23) | V$: | 2 byte integer field containing the audible alarm specifier. |
| (24) | W$: | 2 byte integer field containing the timer entry number for resetting. |
| (25) | X$: | 2 byte integer field containing the timer entry number for starting. |
| (26) | Y$: | 2 byte integer field containing the first "digital out" entry and state. |
| (27) | A0$: | 2 byte integer field containing the second "digital out" entry and state. |
| (28) | A1$: | 2 byte integer field containing the third "digital out" entry and state. |
| (29) | A2$: | 2 byte integer field containing the fourth "digital out" entry and state. |
| (30) | A3$: | 2 byte integer field containing the fifth "digital out" entry and state. |
| (31) | A4$: | 2 byte integer field containing the sixth "digital out" entry and state. |
| (32) | A5$: | 2 byte integer field containing the seventh "digital out" entry and state. |
| (33) | A6$: | 2 byte integer field containing the eighth "digital out" entry and state. |

(3) Message file (message.tab):

The message file has a format as given below:

-continued

| | Name of Field | Description |
|---|---|---|
| (1) | message$: | 39 byte character field containing the message. |
| (2) | fm$: | 1 byte filler. |

(4) Name file (names.tab):
The name file has a format as given below:

| | Name of Field | Description |
|---|---|---|
| (1) | nameentry$: | 8 byte character field containing the name. |
| (2) | nametype$: | 2 byte type of name. 1 = screen name, 2 = "digital out" |

(5) Engineering Units file (engunit.tab):
The engineering units file has a format as below:

| | Name of Field | Description |
|---|---|---|
| (1) | engineeringunits$: | 4 byte character field containing the engineering units. |

(6) Event table file (event.tab):
(a) The first record of the Event table file has one entry. The first two bytes is the number of the last record written.
(b) Each record after the first record has:

| | Name of Field | Description |
|---|---|---|
| (1) | actent$: | 2 byte entry number of the alarm/action entry. |
| (2) | actdate$: | 12 byte date and time of the entry. |

(7) Alarm table file (alarm.tab):
(a) The first record of the Alarm table file has one entry. The first two bytes is the number of the last record written.
(b) Each record after the first record has:

| | Name of Field | Description |
|---|---|---|
| (1) | alarment$: | 2 byte entry number of the alarm/action entry. |
| (2) | typealarm$: | 2 byte type of the alarm entry. 1 = alarm occurred, 2 = alarm acknowledged, 3 = out of alarm |
| (3) | alamrdate$: | 12 byte date and time of the entry. |

(8) Dynamic Display Table (NAME.ddt where NAME is the display name):
(a) The first record of the Dynamic Display Table file has one entry. The first two bytes is the number of records in the file.
(b) Each record after the first record has:

| | Name of Field | Description |
|---|---|---|
| (1) | entry$: | 2 byte entry number of the alarm/action or variable entry. |
| (2) | ulxchar$: | 2 byte x coordinate of the upper left corner of the alarm area. |
| (3) | ulychar$: | 2 byte y coordinate of the upper left corner of the alarm area. |
| (4) | boxx$: | 2 byte size of the alarm area in the x direction. |
| (5) | boxy$: | 2 byte size of the alarm area in the y direction. |
| (6) | alarm$: | 2 byte alarm area for color of alarm. |
| (7) | ulxvalue$: | 2 byte x coordinate of the center of the value area. |
| (8) | ulyvalue: | 2 byte y coordinate of the center of the value area. |
| (9) | typeddt$: | 2 byte type of record. 1 = variable, 2 = alarm/action |
| (10) | fill$: | 2 byte filler for future use. |

(9) Dynamic Display Background file (NAME.SCR where NAME is the display name):
This file contains the background bit pattern making up the graphic screen image of the process.

(10) Symbol Tables file (NAME.SYM where NAME is the symbol table name):
This file contains the graphic images of the symbols used to create a screen. Each symbol table has a similar format as follows:
(1) The first two bytes are used for the number of symbols.
(2) The next 2$n bytes (where n = number of symbols) - each of these locations contains the offset in bytes from the start of the symbol buffer area where the symbol is contained.
(3) The next ??? bytes is the symbol buffer area. The symbols are all stored adjacent each other in screen-ready format. Each symbol has four bytes of x,y information and INT((2*X + 7)/8)*Y bytes of bit information.

(11) Display Table file (display.tab):
This file contains the schematic names and a description for each schematic. Each record has:

| | Name of Field | Description |
|---|---|---|
| (1) | entryname$: | 8 byte name of the schematic. |
| (2) | entry$: | 70 byte description of the schematic. |

The following is the complete program for the preferred embodiment of the invention, which program was written using the IBM Personal Computer BASIC Compiler, version 1:00:

```
Offset  Data    Source Line          IBM Personal Computer BASIC Compiler V1.00

001A   0002    '$title: ' PCVIEW Logical Groupings '
001A   0002    '
001A   0002        DEFINT A-Z
001A   0002    '
001A   0002        gosub 5          'data declarations
002F   0002        gosub 10000      'init
0033   0002        gosub 15         'initial screen
0037   0002    '
0037   0002        end
003A   0002    '
003A   0002    5 '
003A   0002    '
003A   0002    '    Data declarations
003A   0002    '
003A   0002        variablefile$ = "VARFILE.TAB"
0042   0006        screenfile$   = "SCRFILE.TAB"
004A   000A        messagefile$  = "MESSAGE.TAB"
0052   000E        namefile$     = "NAMES.TAB"
005A   0012    '
005A   0012        on error goto 31110
0060   0012        open variablefile$ as #1 len = 64
0072   0012        field #1, 2 as num$, 2 as highentry$, 60 as fv$
008F   001E        get #1, 1
009B   001E        numrecs = cvi(num$)
00A2   0020    '
00A2   0020        on error goto 31115
00A8   0020    '
00A8   0020        open screenfile$ as #2 len = 72
00BA   0020        field #2, 2 as snum$, 2 as entrys$, 68 as fs$
00D7   002C        get #2, 1
00E0   002C        numsrecs = cvi(snum$)
00EA   002E        oldhighentry = cvi(entrys$)
00F4   0030    '
00F4   0030    field 2,2as a$,8as b$,2as c$,2as d$,2as e$,2as f$,2as g$,2as h$
               ,2as i$,2as j$,2as k$,2as l$,2as m$,2as n$,2as o$,2as p$,2as q$
               ,2as r$,2as s$,2as t$,2as u$,2as v$,2as w$,2as x$,2as y$,2as z$
               ,2as a0$,2as a1$,2as a2$,2as a3$,2as a4$,2as a5$,2as a6$
0201   00B4        on error goto 31116
0207   00B4    '
0207   00B4        open messagefile$ as #3 len = 40
0219   00B4        field #3, 39 as message$, 1 as fm$
022E   00BC        on error goto 31117
0234   00BC    '
0234   00BC        open namefile$ as #4 len = 10
0246   00BC        field #4, 8 as nameentry$, 2 as nametype$
025B   00C4    '
025B   00C4        get #4,1
0264   00C4    '
0264   00C4        on error goto 31120
026A   00C4    '
026A   00C4        nullswitch = 0 'disallow null entries
0270   00C6    '
0270   00C6        totalrecords = 200
0276   00C8        dim startx(40)
```

```
0276   011A        dim starty(40)
0276   016C        dim endy(40)
0276   01BE   '
0276   01BE        dim valchar(6)
0276   01CC        dim logic(16)
0276   01EE        dim digitalout(8)
0276   0200   '
0276   0200   '    Switch to decide whether to rotate:
0276   0200   '
0276   0200   '         0) Not applicable
0276   0200   '         1) Screens
0276   0200   '         2) Variables
0276   0200   '
0276   0200        rotateswitch = 1
027C   0202        screenselect = 1
0282   0204        variableselect = 1
0288   0206        numflag = 2
028E   0208        fieldptr = 0
0294   020A   '
0294   020A   '    Tab settings and locations for values
0294   020A   '
0294   020A        tab0 = 22 'high alarm
029A   020C        tab1 = 30 'hi warning
02A0   020E        tab2 = 38 'rate of change
02A6   0210        tab3 = 47 'low alarm
02AC   0212        tab4 = 55 'low warning
02B2   0214        tab5 = 64 'off state
02B8   0216        tab6 = 73 'on state
02BE   0218   '
02BE   0218   '    Masks for determining states
02BE   0218   '
02BE   0218        hia  = &h8000   'one or hi alarm
02C4   021A        hiw  = &h4000   'hi warning
02CA   021C        roc  = &h2000   'rate of change
02D0   021E        lowa = &h1000   'low alarm
02D6   0220        loww = &h800    'low warning
02DC   0222        entrymask = &h07ff
02E2   0224        statemask = &hf800
02E8   0226   '
02E8   0226   '    Flag for which logicalscreen is presently on the display.
02E8   0226   '
02E8   0226        logicalscreen = 0
02EE   0228   '
02EE   0228   '    Read in the field parameters
02EE   0228   '
02EE   0228        for i = 0 to 1000
02F3   0228   '
02F3   0228             read startx(i)
0300   022A             if startx(i) = -1 then goto 11
0313   022A             read starty(i)
0320   022A             read endy(i)
032D   022A   '
032D   022A        next i
033C   022A   '
```

```
033C   022A   11 '
033C   022A   '
033C   022A       fieldptr = 0
0342   022A   '
0342   022A       return
0344   022A   '
0344   022A   15 '
0344   022A   '
0344   022A   '   1. Put up the initial screen
0344   022A   '   2. Get field entries one at a time.
0344   022A   '
0344   022A       goodrun = 1
034A   022C       while goodrun
0355   022C   '
0355   022C           gosub 17        'initialize the variables
0359   022C           gosub 20000     'Initial screen
035D   022C           gosub 20350     'First screen field
0361   022C   '
0361   022C           temp$ = ""
0369   0230           row1 = startx( fieldptr )
0376   0232           col1 = starty( fieldptr )
0383   0234           gosub 20        'get input
0387   0234   '
0387   0234       wend
038A   0234   '
038A   0234       return
038C   0234   '
038C   0234   17 '
038C   0234   '
038C   0234   '   Initialization of variables.
038C   0234   '
038C   0234       oldentry = 0
0392   0236   '
0392   0236       screenname$ = ""
039A   023A   '
039A   023A       for i = 0 to 16
039F   023A           logic(i) = 0
03AB   023A       next
03B9   023A   '
03B9   023A       pagetwo = 0
03BF   023C       pagefour = 0
03C5   023E       message1$ = ""
03CD   0242       message2$ = ""
03D5   0246       message3$ = ""
03DD   024A       ehe = 0
03E3   024C       alarmfun = 0
03E9   024E       aalarm = 0
03EF   0250       resetimer = 0
03F5   0252       startimer = 0
03FB   0254   '
03FB   0254       for i = 0 to 8
0400   0254           digitalout(i) = 0
040C   0254       next
041A   0254   '
```

```
041A   0254        return
041C   0254   '
041C   0254   20 '
041C   0254   '
041C   0254   '    Get first input data
041C   0254   '
041C   0254        badinput = 1
0422   0256   '
0422   0256        while badinput
042D   0256   '
042D   0256             gosub 21000 ' turn on the blink
0431   0256             gosub 20100 ' get key input
0435   0256   '
0435   0256             if error1 > 10 then gosub 20700
0443   0258   '
0443   0258        wend
0446   0258   '
0446   0258        return
0448   0258   '
0448   0258   30 '
0448   0258   '
0448   0258   '    Field Checker
0448   0258   '    This is where the individual checking module calls will re
              side.
0448   0258   '
0448   0258        returncode = 0    'clear error flag
044E   025A   '
044E   025A   '    First logical screen of data.
044E   025A   '
044E   025A        if fieldptr = 0 then gosub 48: if returncode = 0 then scre
              ename$ = temp$: locate row1, starty(fieldptr): print screename$
              ;
0489   025A   '
0489   025A   '    Second logical screen of data.
0489   025A   '
0489   025A        for imbecile = 1 to 15
048F   025A             if fieldptr = imbecile then gosub 400: if returncode = 0 the
              n logic(fieldptr - 1) = temp: if fieldptr > pagetwo then pagetw
              o = fieldptr
04C9   025E        next
04D7   025E   '
04D7   025E   '    Third logical screen of data.
04D7   025E   '
04D7   025E   '    Messages.......
04D7   025E   '
04D7   025E        if fieldptr = 16 then message1$ = temp$
04E9   025E        if fieldptr = 17 then message2$ = temp$
04FB   025E        if fieldptr = 18 then gosub 520: if returncode = 0 then me
              ssage3$ = temp$
051B   025E   '
051B   025E   '    Numbers:   0 = no 1 = yes
051B   025E   '
051B   025E        if fieldptr = 19 then gosub 500: if returncode = 0 then eh
              e = temp
```

```
0539   025E         if fieldptr = 20 then gosub 500: if returncode = 0 then al
                armfun = temp
0557   025E         if fieldptr = 21 then gosub 510: if returncode = 0 then aa
                larm = temp
0575   025E     '
0575   025E         if fieldptr < 22 and fieldptr > 18 then locate row1, start
                y(fieldptr): print temp$;
05AF   025E     '
05AF   025E     '   Timer variables
05AF   025E     '
05AF   025E         if fieldptr = 22 then gosub 550: if returncode = 0 then re
                settimer = temp
05CD   025E         if fieldptr = 23 then gosub 550: if returncode = 0 then st
                artimer = temp
05EB   025E     '
05EB   025E     '   Fourth screen
05EB   025E     '
05EB   025E         for imbecile = 24 to 31
05F1   025E             if fieldptr = imbecile then gosub 600: if returncode = 0 the
                n digitalout(fieldptr - 24) = temp: if fieldptr > pagefour then
                 pagefour = fieldptr
062B   025E         next
0639   025E     '
0639   025E     '   If good returncode from the field checker then:
0639   025E     '
0639   025E     '       1) increment the fieldptr.
0639   025E     '       2) check the firstscreen switch.
0639   025E     '       3) check the page positioning.
0639   025E     '       4) check for old field values.
0639   025E     '
0639   025E         if returncode = 0 then fieldptr = fieldptr + 1
064A   025E         if returncode = 0 then if fieldptr = 1 then gosub 20180
0662   025E     '
0662   025E         gosub 32 'check the page positioning and the old field val
                ues.
0666   025E     '
0666   025E         return
0668   025E     '
0668   025E     32 '
0668   025E     '
0668   025E     '   Check the page positioning parameters and the old field va
                lues.
0668   025E     '
0668   025E         if returncode = 0 then gosub 35
0676   025E         if returncode = 0 then gosub 36
0684   025E     '
0684   025E     34 '
0684   025E     '
0684   025E     '   Set the logical flags appropriately for each field.
0684   025E     '
0684   025E     '   Set numflag for appropriate data.
0684   025E     '
0684   025E     '       numflag = 0 for integer fields
0684   025E     '       numflag = 1 for decimal fields
```

```
0684   025E   '         numflag = 2 for letter fields
0684   025E   '         numflag = 3 for anything fields.
0684   025E   '
0684   025E   '    Set rotateswitch for appropriate data.
0684   025E   '
0684   025E   '         rotateswitch = 0 for no rotate
0684   025E   '         rotateswitch = 1 for screen name rotate
0684   025E   '         rotateswitch = 2 for variable name rotate
0684   025E   '         rotateswitch = 3 for Y/N rotate
0684   025E   '         rotateswitch = 4 for 1/2 rotate
0684   025E   '         rotateswitch = 5 then rotate digital outs
0684   025E   '         rotateswitch = 6 then rotate timer variables
0684   025E   '
0684   025E        if fieldptr < 16 or fieldptr > 22 then nullswitch = 0 else
              nullswitch = 1
06B2   025E   '
06B2   025E   '    Reset the rotate flags for yes/no and 1/2
06B2   025E   '
06B2   025E        rotateyn = 0
06B8   0260        rotate12 = 0
06BE   0262   '
06BE   0262   '    Switch setter for screen 1 and 2
06BE   0262   '
06BE   0262        if fieldptr => 0 and fieldptr < 16 then numflag = 2: rotat
              eswitch = 2
06E9   0262        if fieldptr = 0 then rotateswitch = 1
06F9   0262   '
06F9   0262   '    Switch setter for screen 3
06F9   0262   '
06F9   0262        if fieldptr = 16 or fieldptr = 17 then numflag = 3: rotate
              switch = 0
0724   0262        if fieldptr = 18 then rotateswitch = 0: numflag = 2
073A   0262        if fieldptr = 19 or fieldptr = 20 then rotateswitch = 3: n
              umflag = 2
0765   0262        if fieldptr = 21 then rotateswitch = 4: numflag = 0
077B   0262        if fieldptr = 22 then rotateswitch = 6: numflag = 2
0791   0262        if fieldptr = 23 then rotateswitch = 6: numflag = 2
07A7   0262   '
07A7   0262   '    Switch setter for screen 4
07A7   0262   '
07A7   0262        if fieldptr > 23 then rotateswitch = 5: numflag = 2
07BD   0262   '
07BD   0262   '    Set the message flag
07BD   0262   '
07BD   0262        if fieldptr = 0 then if error1 < 10 then error1 = 0: gosub
               20700
07DB   0262   '
07DB   0262        if fieldptr = 1 then if error1 < 10 then error1 = 3: gosub
               20700
07F9   0262   '
07F9   0262        if fieldptr = 16 then if error1 < 10 then error1 = 5: gosu
              b 20700
0817   0262        if fieldptr = 18 then if error1 < 10 then error1 = 6: gosu
              b 20700
```

```
0835   0262       if fieldptr = 19 then if error1 < 10 then error1 = 7: gosu
               b 20700
0853   0262       if fieldptr = 22 then if error1 < 10 then error1 = 1: gosu
               b 20700
0871   0262    '
0871   0262       if fieldptr = 24 then if error1 < 10 then error1 = 8: gosu
               b 20700
088F   0262    '
088F   0262       return
0891   0262    '
0891   0262    35 '
0891   0262    '
0891   0262    '   Subroutine to check the logical positions of fieldptr
0891   0262    '   in relationship to the current screen.
0891   0262    '
0891   0262       if logicalscreen = 1 and fieldptr > 16 then fieldptr = 16:
                error1 = 126
08BC   0262       if logicalscreen = 2 and fieldptr > 23 then fieldptr = 23:
                error1 = 126
08E7   0262       if logicalscreen = 3 and fieldptr > 31 then fieldptr = 31:
                error1 = 126
0912   0262    '
0912   0262       if logicalscreen = 1 and fieldptr = 0 then fieldptr = 1: e
               rror1 = 126
093D   0262       if logicalscreen = 2 and fieldptr = 15 then fieldptr = 16:
                error1 = 126
0968   0262       if logicalscreen = 3 and fieldptr = 23 then fieldptr = 24:
                error1 = 126
0993   0262    '
0993   0262       return
0995   0262    '
0995   0262    36 '
0995   0262    '
0995   0262    '   Point to the new field
0995   0262    '
0995   0262       gosub 70
0999   0262    '
0999   0262       temp$ = ""
09A1   0262       row1 = startx(fieldptr)
09AE   0262       col1 = starty(fieldptr)
09BB   0262       locate row1, col1, 0
09CE   0262    '
09CE   0262    '   Check to see if there is already a value for a field and d
               isplay it.
09CE   0262    '
09CE   0262       if fieldptr = 0 then if screename$ <> "" then print screen
               ame$;: temp$ = screename$: col1 = col1 + len(temp$)
0A01   0262    '
0A01   0262    '   Second logical screen of data.
0A01   0262    '
0A01   0262       for imbl = 1 to 15
0A07   0262           if fieldptr = imbl then locate row1, tab0, 0: print string$(
               57," ");
0A33   0264           if fieldptr = imbl then if logic(fieldptr-1) <> 0 then gosub
```

```
                38
0A53    0264        next
0A61    0264    '
0A61    0264    '   Third logical screen of data.
0A61    0264    '
0A61    0264    '   Messages.......
0A61    0264    '
0A61    0264        if fieldptr = 16 then if message1$ <> "" then print messag
                e1$;: temp$ = message1$: col1 = col1 + len(temp$)
0A94    0264        if fieldptr = 17 then if message2$ <> "" then print messag
                e2$;: temp$ = message2$: col1 = col1 + len(temp$)
0AC7    0264        if fieldptr = 18 then if message3$ <> "" then print messag
                e3$;: temp$ = message3$: col1 = col1 + len(temp$)
0AFA    0264    '
0AFA    0264    '   Numbers:   0 = no 1 = yes
0AFA    0264    '
0AFA    0264        if fieldptr = 19 then temp = ehe: if ehe = 0 then temp$ =
                "N" else temp$ = "Y"
0B27    0264        if fieldptr = 20 then temp = alarmfun: if alarmfun = 0 the
                n temp$ = "N" else temp$ = "Y"
0B54    0264        if fieldptr = 21 then temp = aalarm: if aalarm = 2 then te
                mp$ = "2" else temp$ = "1"
0B81    0264    '
0B81    0264        if fieldptr > 18 and fieldptr < 22 then print temp$;: col1
                 = col1 + len(temp$)
0BB4    0264    '
0BB4    0264    '   Timer variables
0BB4    0264    '
0BB4    0264        if fieldptr > 21 and fieldptr < 24 then gosub 80
0BD7    0264    '
0BD7    0264    '   Digital outs
0BD7    0264    '
0BD7    0264        for imb1 = 24 to 31
0BDD    0264            if fieldptr = imb1 then locate row1, tab0, 0: print string$(
                57," ");
0C09    0264            if fieldptr = imb1 then if digitalout(fieldptr - 24) <> 0 th
                en gosub 39
0C29    0264        next
0C37    0264    '
0C37    0264        locate row1, col1, 0
0C4A    0264    '
0C4A    0264        return
0C4C    0264    '
0C4C    0264    38 '
0C4C    0264    '
0C4C    0264    '   Logical groupings getter of temp.
0C4C    0264    '
0C4C    0264        returncode = 0
0C52    0264        temp = logic(fieldptr - 1)
0C5F    0264    '
0C5F    0264        gosub 40
0C63    0264    '
0C63    0264        return
0C65    0264    '
```

```
0C65   0264   39 '
0C65   0264   '
0C65   0264   '    Digital out getter of temp.
0C65   0264   '
0C65   0264        returncode = 0
0C6B   0264        temp = digitalout(fieldptr - 24)
0C78   0264   '
0C78   0264        gosub 40
0C7C   0264   '
0C7C   0264        return
0C7E   0264   '
0C7E   0264   40 '
0C7E   0264   '
0C7E   0264   '    1) Get variable name
0C7E   0264   '    2) Put up name
0C7E   0264   '
0C7E   0264        j = temp and entrymask
0C88   0266   '
0C88   0266        gosub 42
0C8C   0266   '
0C8C   0266        if returncode <> 0 then returncode = 0: return
0C9E   0266   '
0C9E   0266        gosub 44
0CA2   0266   '
0CA2   0266        return
0CA4   0266   '
0CA4   0266   42 '
0CA4   0266   '
0CA4   0266   '    Get the correct variable to match the entry number.
0CA4   0266   '
0CA4   0266        for i = 2 to numrecs + 1
0CB1   0268   '
0CB1   0268            get #1, i
0CBB   0268            k = cvi(et$)
0CC5   026E            if k = j then return
0CD3   026E   '
0CD3   026E        next
0CE3   026E   '
0CE3   026E        error1 = 150
0CE9   026E        returncode = 1
0CEF   026E   '
0CEF   026E        return
0CF1   026E   '
0CF1   026E   44 '
0CF1   026E   '
0CF1   026E   '    Put up the info.
0CF1   026E   '
0CF1   026E   '    1) Variable name
0CF1   026E   '    2) Variable state
0CF1   026E   '
0CF1   026E        locate row1, col1, 0
0D04   026E   '
0D04   026E   '    Check the sensor type and activate the correct field state
              ment
```

```
0D04   026E   '
0D04   026E        sensor = cvi(senseup$)
0D0E   0274        gosub 211
0D12   0274   '
0D12   0274        temp$ = varup$
0D1A   0278        print temp$;
0D21   0278   '
0D21   0278   '    Determine where the value should go.
0D21   0278   '
0D21   0278        if sensor > 1 then 46
0D2B   0278   '
0D2B   0278        j = temp and hia: if j = hia then first = tab0: x! = cvs(h
              lup$)
0D52   0282        j = temp and hiw: if j = hiw then first = tab1: x! = cvs(h
              wlup$)
0D79   0286        j = temp and roc: if j = roc then first = tab2: x! = cvs(r
              ocup$)
0DA0   028A        j = temp and lowa: if j = lowa then first = tab3: x! = cvs
              (lowlup$)
0DC7   028E        j = temp and loww: if j = loww then first = tab4: x! = cvs
              (lwlup$)
0DEE   0292   '
0DEE   0292   46 '
0DEE   0292   '
0DEE   0292   '    Label to skip to if not an analog ·
0DEE   0292   '
0DEE   0292        if sensor > 1 then gosub 47
0DFC   0292   '
0DFC   0292   '    Put up the value
0DFC   0292   '
0DFC   0292        locate row1, first, 0
0E0F   0292        if sensor = 1 then gosub 310 else print x1$;
0E27   0296   '
0E27   0296   '    Reverse video the item.
0E27   0296   '
0E27   0296        gosub 470
0E2B   0296   '
0E2B   0296        col1 = starty(fieldptr) + len(temp$)
0E3F   0296   '
0E3F   0296        return
0E41   0296   '
0E41   0296   47 '
0E41   0296   '
0E41   0296   '    Get the status message
0E41   0296   '
0E41   0296        gosub 212
0E45   0296   '
0E45   0296        j = temp and hia
0E4F   0296        if j = hia then first = tab6: x1 = cvi(onesup$) else first
               = tab5: x1 = cvi(zerosup$)
0E7E   02A0        get $4, x1
0EB8   02A0        x1$ = nameentry$
0E90   02A0   '
0E90   02A0        return
```

```
0E92   02A0   '
0E92   02A0   48 '
0E92   02A0   '
0E92   02A0   '    If fieldptr = 0 then check for the existence of the variab
              le in the
0E92   02A0   '    variable file and the screen file.
0E92   02A0   '
0E92   02A0        if temp$ <> screenname$ then gosub 17
0EA3   02A0   '
0EA3   02A0        foundflag = 0
0EA9   02A2        if fieldptr = 0 then gosub 50          'variable file
0EB7   02A2   '
0EB7   02A2        if foundflag = 0 then gosub 60 else error1 = 111: returnco
              de = 1: return
0ED6   02A2   '
0ED6   02A2        if foundflag <> 0 then gosub 100       'Display screen info
              .
0EE4   02A2   '
0EE4   02A2        return
0EE6   02A2   '
0EE6   02A2   50 '
0EE6   02A2   '
0EE6   02A2   '    Check for the existence of the variable in the variable ta
              ble
0EE6   02A2   '
0EE6   02A2        var$ = temp$
0EEE   02A6        v = len(var$)
0EF7   02A8        if v < 8 then var$ = var$ + string$(8 - v," ")
0F16   02A8   '
0F16   02A8        field #1, 2 as senseup$, 8 as varup$, 2 as clusterup$, 2 a
              s et$, 50 as fillup$
0F43   02B0   '
0F43   02B0        foundflag = 0
0F49   02B0        for i = 2 to totalrecords
0F55   02B2            get #1, i
0F5F   02B2            if cvi(senseup$) <> -1 then if var$ = varup$ then foundflag
              = i: goto 51
0F83   02B2        next
0F93   02B2   '
0F93   02B2   51 '
0F93   02B2   '
0F93   02B2   '    Variable found
0F93   02B2   '
0F93   02B2        return
0F95   02B2   '
0F95   02B2   60 '
0F95   02B2   '
0F95   02B2   '    Screen file search
0F95   02B2   '
0F95   02B2        foundflag = 0
0F9B   02B2        for i = 2 to totalrecords
0FA7   02B4            get #2, i
0FB1   02B4            name$ = b$
0FB9   02B8            if cvi(a$) <> -1 then if var$ = name$ then foundflag = i: go
```

```
                to 61
0FDD   02B8        next
0FED   02B8     '
0FED   02B8     61 '
0FED   02B8     '
0FED   02B8     '  Variable found
0FED   02B8     '
0FED   02B8        return
0FEF   02B8     '
0FEF   02B8     70 '
0FEF   02B8     '
0FEF   02B8     '  Clean up the fields
0FEF   02B8     '
0FEF   02B8        a = starty(fieldptr)
0FFC   02BA        b = endy(fieldptr)
1009   02BC        locate startx(fieldptr), a, 0
1022   02BC        c = b - a + 1
102F   02BE        print string$(c, " ");
103D   02BE     '
103D   02BE        return
103F   02BE     '
103F   02BE     80 '
103F   02BE     '
103F   02BE     '  Put up info for the reset timer and start timer
103F   02BE     '
103F   02BE        if fieldptr = 22 then temp = resetimer
104F   02BE        if fieldptr = 23 then temp = startimer
105F   02BE     '
105F   02BE        if temp > 0 then j = temp else return
1074   02BE        gosub 42
1078   02BE        temp$ = varup$
1080   02BE        print temp$;
1087   02BE        col1 = col1 + len(temp$)
1094   02BE     '
1094   02BE        return
1096   02BE     '
1096   02BE     100 '
1096   02BE     '
1096   02BE     '  Display screen information for previously defined screen.
1096   02BE     '
1096   02BE        oldentry = foundflag
109C   02BE     '
109C   02BE        screename$ = b$
10A4   02BE     '
10A4   02BE        logic(0) = cvi(c$)
10AE   02BE     '
10AE   02BE        logic(1) = cvi(d$)
10B8   02BE     '
10B8   02BE        logic(2) = cvi(e$)
10C2   02BE     '
10C2   02BE        logic(3) = cvi(f$)
10CC   02BE     '
10CC   02BE        logic(4) = cvi(g$)
10D6   02BE     '
```

```
10D6   02BE          logic(5) = cvi(h$)
10E0   02BE     '
10E0   02BE          logic(6) = cvi(i$)
10EA   02BE     '
10EA   02BE          logic(7) = cvi(j$)
10F4   02BE     '
10F4   02BE          logic(8) = cvi(k$)
10FE   02BE     '
10FE   02BE          logic(9) = cvi(l$)
1108   02BE     '
1108   02BE          logic(10) = cvi(m$)
1112   02BE     '
1112   02BE          logic(11) = cvi(n$)
111C   02BE     '
111C   02BE          logic(12) = cvi(o$)
1126   02BE     '
1126   02BE          logic(13) = cvi(p$)
1130   02BE     '
1130   02BE          logic(14) = cvi(q$)
113A   02BE     '
113A   02BE     '    Third page of data
113A   02BE     '
113A   02BE     '    User screen message number.
113A   02BE     '
113A   02BE          i = cvi(r$)
1144   02BE          if i <> -1 then get #3, i else message$ = ""
1163   02BE          message1$ = message$
116B   02BE          field #3, 39 as message$, 1 as fm$
11B0   02BE     '
11B0   02BE     '    Bottom of the screen message number.
11B0   02BE     '
11B0   02BE          i = cvi(s$)
118A   02BE          if i <> -1 then get #3, i else message$ = ""
11A9   02BE          message2$ = message$
11B1   02BE          field #3, 39 as message$, 1 as fm$
11C6   02BE     '
11C6   02BE     '    Full screen message name number.
11C6   02BE     '
11C6   02BE     '    Name type =
11C6   02BE     '                   1) fullscreen help file
11C6   02BE     '
11C6   02BE          i = cvi(t$)
11D0   02BE          if i <> -1 then get #4, i else nameentry$ = ""
11EF   02BE          message3$ = nameentry$
11F7   02BE     '
11F7   02BE          field #4, 8 as nameentry$, 2 as nametype$
120C   02BE     '
120C   02BE     '    Event history file switch.
120C   02BE     '
120C   02BE          ehe = cvi(u$)
1216   02BE     '
1216   02BE     '    Alarmable function?????
1216   02BE     '
1216   02BE          alarmfun = cvi(v$)
```

```
1220   02BE   '
1220   02BE   '    Audible horn switch
1220   02BE   '
1220   02BE        aalarm = cvi(w$)
122A   02BE   '
122A   02BE   '    Reset timer
122A   02BE   '
122A   02BE        resetimer = cvi(x$)
1234   02BE   '
1234   02BE   '    Start timer
1234   02BE   '
1234   02BE        starttimer = cvi(y$)
123E   02BE   '
123E   02BE   '    Fourth screen of data
123E   02BE   '
123E   02BE        digitalout(0) = cvi(z$)
1248   02BE   '
1248   02BE        digitalout(1) = cvi(a0$)
1252   02BE   '
1252   02BE        digitalout(2) = cvi(a1$)
125C   02BE   '
125C   02BE        digitalout(3) = cvi(a2$)
1266   02BE   '
1266   02BE        digitalout(4) = cvi(a3$)
1270   02BE   '
1270   02BE        digitalout(5) = cvi(a4$)
127A   02BE   '
127A   02BE        digitalout(6) = cvi(a5$)
1284   02BE   '
1284   02BE        digitalout(7) = cvi(a6$)
128E   02BE   '
128E   02BE        return
1290   02BE   '
1290   02BE   211 '
1290   02BE   '
1290   02BE   '    Field statement for Analog in
1290   02BE   '
1290   02BE        field #1, 2 as senseup$, 8 as varup$, 2 as clusterup$, 2 a
              s et$, 2 as channelup$, 2 as engup$, 4 as deadup$, 4 as lowlup$
              , 4 as hlup$, 4 as rocup$, 4 as lwlup$, 4 as hwlup$, 4 as zengu
              p$, 4 as fengup$, 4 as ratio$, 10 as filla$
1315   02DA   '
1315   02DA        return
1317   02DA   '
1317   02DA   212 '
1317   02DA   '
1317   02DA   '    Digital field statement
1317   02DA   '
1317   02DA        field #1, 2 as senseup$, 8 as varup$, 2 as clusterup$, 2 a
              s et$, 2 as portup$, 2 as bitup$, 2 as zerosup$, 2 as onesup$,
              42 as filld$
1364   02E6   '
1364   02E6        return
1366   02E6   '
```

```
1366   02E6   310 '
1366   02E6   '
1366   02E6   '    Format and display reals
1366   02E6   '
1366   02E6        reala$ = str$(x!)
1371   02EA        b = len(reala$)
137A   02EA        if x! >= 0 then b = b - 1
138B   02EA        if x! > = 0 then reala$ = mid$(reala$, 2, b)
13A7   02EA        x = len(reala$)
13B0   02EC        if x < length then reala$ = reala$ + string$(length - x, "
              ")
13D2   02EE        print reala$;
13D9   02EE   '
13D9   02EE        return
13DB   02EE   '
13DB   02EE   400 '
13DB   02EE   '
13DB   02EE   '    Handle variable and state choice.
13DB   02EE   '
13DB   02EE        gosub 50
13DF   02EE   '
13DF   02EE        if foundflag = 0 then error1 = 58: returncode = 1: return
13F7   02EE   '
13F7   02EE   '    Get the correct field statement, 1 = ANALOG, 2 or 3 = DIGI
              TAL.
13F7   02EE   '
13F7   02EE        sensor = cvi(senseup$)
1401   02EE        entry = cvi(et$)
140B   02F0   '
140B   02F0   '    First clean-up both fields then branch according to sensor
              .
140B   02F0   '
140B   02F0        locate row1, tab0, 0
141E   02F0        print string$(57," ");
142B   02F0   '
142B   02F0        if sensor = 1 then gosub 211 else gosub 212
1440   02F0   '
1440   02F0   '    Display the correct fields
1440   02F0   '
1440   02F0        color 15,1,0
1451   02F0   '
1451   02F0        state = 0
1457   02F2   '
1457   02F2        If sensor = 1 then gosub 410 else gosub 420
146C   02F2   '
146C   02F2   '    Set state according to bit flags
146C   02F2   '
146C   02F2        if state = 0  then state = hiw  'zero status
147C   02F2        if state = 1  then state = hia  'one or hi alarm
148C   02F2        if state = 2  then state = hiw  'hi warning
149C   02F2        if state = 4  then state = roc   'rate of change
14AC   02F2        if state = 8  then state = lowa  'low alarm
14BC   02F2        if state = 16 then state = loww  'low warning
14CC   02F2   '
```

```
14CC   02F2        temp = entry or state
14D6   02F2     '
14D6   02F2     '   Reset the prompt message.
14D6   02F2     '
14D6   02F2        if fieldptr < 17 then error1 = 3 else error1 = 8
14EF   02F2        gosub 20700
14F3   02F2     '
14F3   02F2        return
14F5   02F2     '
14F5   02F2     410 '
14F5   02F2     '
14F5   02F2     '   Analog choice maker
14F5   02F2     '
14F5   02F2        tabfield = 0
14FB   02F4     '
14FB   02F4        locate row1, tab0, 0
150E   02F4        x! = cvs( hlup$ )
1519   02F4        gosub 310
151D   02F4     '
151D   02F4        first = tab0
1523   02F4        color 16,15,0
1534   02F4        gosub 470
1538   02F4     '
1538   02F4        color 15,1,0
1549   02F4        locate row1, tab1, 0
155C   02F4        x! = cvs( hwlup$ )
1567   02F4        gosub 310
156B   02F4     '
156B   02F4        locate row1, tab2, 0
157E   02F4        x! = cvs( rocup$ )
1589   02F4        gosub 310
158D   02F4     '
158D   02F4        locate row1, tab3, 0
15A0   02F4        x! = cvs( lowlup$ )
15AB   02F4        gosub 310
15AF   02F4     '
15AF   02F4        locate row1, tab4, 0
15C2   02F4        x! = cvs( lwlup$ )
15CD   02F4        gosub 310
15D1   02F4     '
15D1   02F4        gosub 430
15D5   02F4
15D5   02F4        return
15D7   02F4     '
15D7   02F4     420 '
15D7   02F4     '
15D7   02F4     '   Digital choice maker
15D7   02F4     '
15D7   02F4        tabfield = 5
15DD   02F4     '
15DD   02F4        locate row1, tab5, 0
15F0   02F4        x1 = cvi(zerosup$)
15FA   02F4        get #4, x1
1604   02F4        x1$ = nameentry$
```

```
160C   02F4        print x1$;
1613   02F4    '
1613   02F4    '   Highlight first area
1613   02F4    '
1613   02F4        first = tab5
1619   02F4        color 16,15,0
162A   02F4        gosub 470
162E   02F4    '
162E   02F4        color 15,1,0
163F   02F4        locate row1, tab6, 0
1652   02F4        x1 = cvi(onesup$)
165C   02F4        get #4, x1
1666   02F4        x1$ = nameentry$
166E   02F4        print x1$;
1675   02F4    '
1675   02F4        gosub 430
1679   02F4    '
1679   02F4        return
167B   02F4    '
167B   02F4    430 '
167B   02F4    '
167B   02F4    '   Loop to get key input
167B   02F4    '
167B   02F4        tabswitch = 1
1681   02F6    '
1681   02F6        error1 = 9
1687   02F6        gosub 20700
168B   02F6    '
168B   02F6    '   Loop until appropriate key is pressed.
168B   02F6    '
168B   02F6        while tabswitch
1696   02F6    '
1696   02F6            gosub 431
169A   02F6            if error1 <> 9 then gosub 20700
16A8   02F6            error1 = 9
16AE   02F6    '
16AE   02F6        wend
16B1   02F6    '
16B1   02F6        return
16B3   02F6    '
16B3   02F6    431 '
16B3   02F6    '
16B3   02F6    '   Handle tabbing and selection function
16B3   02F6    '
16B3   02F6        key1$ = inkey$
16BB   02FA        if key1$ = "" then gosub 20006: goto 431
16CF   02FA    '
16CF   02FA    '   Key entered
16CF   02FA    '
16CF   02FA        if len(key1$) > 1 then key1$ = right$(key1$,1)
16EB   02FA        key1 = asc(key1$)
16F4   02FC    '
16F4   02FC        if key1 <> 9 and key1 <> 15 and key1 <> 13 then error1 = 1
               02: return
```

```
1728   02FC    '
1728   02FC         if key1 = 13 then gosub 440 else gosub 450
173D   02FC    '
173D   02FC         return
173F   02FC    '
173F   02FC    440 '
173F   02FC    '
173F   02FC    '    Enter pressed
173F   02FC    '
173F   02FC    '         1) Reset the Tab loop switch.
173F   02FC    '         2) Record the state.
173F   02FC    '         3) Clean-up the screen.
173F   02FC    '
173F   02FC         tabswitch = 0
1745   02FC    '
1745   02FC         gosub 460
1749   02FC         color 15,1,0
175A   02FC         gosub 470
175E   02FC    '
175E   02FC         state = 2 ^ tabfield
1770   02FC         if sensor > 1 then state = tabfield - 5
1783   02FC    '
1783   02FC         if sensor > 1 then if state = 0 then locate row1, tab6, 0
               else locate row1, tab5, 0
17C0   02FC         if sensor > 1 then print string$(8," ");: return
17D9   02FC    '
17D9   02FC         for i = 0 to 6
17DE   02FC              valchar(i) = screen(row1, first + i)
17FB   02FC         next
1809   02FC    '
1809   02FC         locate row1, tab0, 0
181C   02FC    '
181C   02FC         print string$(40, " ");
1829   02FC    '
1829   02FC         for i = 0 to 6
182E   02FC              locate row1, first + i, 0
1845   02FC              print chr$(valchar(i));
1856   02FC         next
1864   02FC    '
1864   02FC         return
1866   02FC    '
1866   02FC    450 '
1866   02FC    '
1866   02FC    '    Tab key was pressed so:
1866   02FC    '
1866   02FC    '         1) Highlight the new area and un-highlight the old ar
               ea
1866   02FC    '
1866   02FC         gosub 460
186A   02FC    '
186A   02FC    '    unhighlight the old area
186A   02FC    '
186A   02FC         color 15,1,0
187B   02FC         gosub 470
```

```
187F   02FC    '
187F   02FC        if key1 = 9 then j = 1 else j = -1
189B   02FC    '
189B   02FC        tabfield = tabfield + j
18A2   02FC    '
18A2   02FC        if sensor = 1 then if tabfield > 4 then tabfield = 0
18BC   02FC        if sensor > 1 then if tabfield < 5 then tabfield = 5
18D6   02FC        if tabfield = 7 then tabfield = 5
18E6   02FC        if tabfield < 0 then tabfield = 0
18F6   02FC    '
18F6   02FC        gosub 460
18FA   02FC    '
18FA   02FC        color 16,15,0
190B   02FC        gosub 470
190F   02FC        color 15,1,0
1920   02FC    '
1920   02FC        return
1922   02FC    '
1922   02FC    460 '
1922   02FC    '
1922   02FC    '   Point to the correct area on the basis of tabfield.
1922   02FC    '
1922   02FC        if tabfield = 0 then first = tab0
1932   02FC        if tabfield = 1 then first = tab1
1942   02FC        if tabfield = 2 then first = tab2
1952   02FC        if tabfield = 3 then first = tab3
1962   02FC        if tabfield = 4 then first = tab4
1972   02FC        if tabfield = 5 then first = tab5
1982   02FC        if tabfield = 6 then first = tab6
1992   02FC    '
1992   02FC        return
1994   02FC    '
1994   02FC    470 '
1994   02FC    '
1994   02FC    '   Highlight or un-highlight the chosen area
1994   02FC    '
1994   02FC        for i = 0 to 7
1999   02FC            t1 = screen( row1, first + i)
19AF   02FE            locate row1, first + i, 0
19C6   02FE            if t1 <> 32 then print chr$(t1);
19DB   02FE        next
19E9   02FE    '
19E9   02FE        return
19EB   02FE    '
19EB   02FE    500 '
19EB   02FE    '
19EB   02FE    '   Yes or No checker.
19EB   02FE    '
19EB   02FE        if len( temp$) > 1 then temp$ = right$(temp$, 1)
1A07   02FE    '
1A07   02FE        If temp$ <> "Y" and temp$ <> "N" then error1 = 120: return
               code = 1
1A35   02FE        If temp$ = "Y" then temp = 1
1A48   02FE        if temp$ = "N" then temp = 0
```

```
1A5B  02FE  '
1A5B  02FE       return
1A5D  02FE  '
1A5D  02FE  510 '
1A5D  02FE  '
1A5D  02FE  '    1 or 2 checker.
1A5D  02FE  '
1A5D  02FE       if len( temp$) > 1 then temp$ = right$(temp$, 1)
1A79  02FE  '
1A79  02FE       if temp$ <> "1" and temp$ <> "2" then error1 = 120: return
            code = 1
1AA7  02FE       if temp$ = "1" then temp = 1
1ABA  02FE       if temp$ = "2" then temp = 2
1ACD  02FE       locate row1, starty(fieldptr)
1AE1  02FE       print temp$;
1AE8  02FE  '
1AE8  02FE       return
1AEA  02FE  '
1AEA  02FE  520 '
1AEA  02FE  '
1AEA  02FE  '    Check for existence of a Dynamic display
1AEA  02FE  '
1AEA  02FE       file$ = temp$ + ".ddt"
1AF7  0302       on error goto 521
1AFD  0302       open file$ for input as #5
1B0D  0302       close #5
1B13  0302       on error goto 31120
1B19  0302  '
1B19  0302       return
1B1B  0302  '
1B1B  0302  521  '
1B1B  0302  '
1B1B  0302  '    No file found error
1B1B  0302  '
1B1B  0302       error1 = 123
1B21  0302       returncode = 1
1B27  0302  '
1B27  0302       resume next
1B2A  0302  '
1B2A  0302  550 '
1B2A  0302  '
1B2A  0302  '    Check that a valid timer variable was entered
1B2A  0302  '
1B2A  0302       gosub 50
1B2E  0302       if foundflag = 0 then error1 = 58: returncode = 1: return
1B46  0302       if cvi(senseup$) <> 4 then error1 = 160: returncode = 1: r
            eturn
1B62  0302       temp = cvi(et$)
1B6C  0302  '
1B6C  0302       return
1B6E  0302  '
1B6E  0302  600 '
1B6E  0302  '
1B6E  0302  '    Checker of the Digital Outs.
```

```
1B6E  0302   '
1B6E  0302       gosub 50
1B72  0302   '
1B72  0302       if foundflag = 0 then error1 = 58: returncode = 1: return
1B8A  0302   '
1B8A  0302       entry = cvi(et$)
1B94  0302       sensor = cvi(senseup$)
1B9E  0302       if sensor <> 2 then error1 = 59: returncode = 1: return
1BB6  0302   '
1BB6  0302   '   Digital out choosen so get the state.
1BB6  0302   '
1BB6  0302       state = 0
1BBC  0302   '
1BBC  0302       gosub 420
1BC0  0302   '
1BC0  0302   '   Set state according to bit flags
1BC0  0302   '
1BC0  0302       if state = 1  then state = hia  '1 status
1BD0  0302       if state = 0  then state = hiw  '0 status
1BE0  0302   '
1BE0  0302       temp = entry or state
1BEA  0302   '
1BEA  0302   '   Reset the prompt message.
1BEA  0302   '
1BEA  0302       error1 = 3
1BF0  0302       gosub 20700
1BF4  0302   '
1BF4  0302       return
1BF6  0302   '
1BF6  0302   10000 '
1BF6  0302   '
1BF6  0302   '   Initialization
1BF6  0302   '
1BF6  0302   '        1. Turn off the PF keys
1BF6  0302   '        2. Switch to the color tube
1BF6  0302   '
1BF6  0302       error1 = 1
1BFC  0302   '
1BFC  0302       key off
1C01  0302       for i = 1 TO 10: key i,"" : next i
1C1F  0302   '
1C1F  0302   '   switch to the color tube
1C1F  0302   '
1C1F  0302       screen 0,0,0,0
1C33  0302       DEF SEG = 0
1C38  0302       A = PEEK(&H410)
1C49  0302       WIDTH 80
1C4F  0302       POKE &H410, (A AND &HCF) OR &H10
1C66  0302       SCREEN 1,0,0,0
1C7B  0302       SCREEN 0
1C80  0302       locate ,,0,0,0
1C95  0302       WIDTH 80
1C9B  0302       DEF SEG
1C9E  0302   '
```

```
1C9E   0302        COLOR 15,1,0
1CAF   0302   '
1CAF   0302        RETURN
1CB1   0302   '
1CB1   0302   20000 '
1CB1   0302   '
1CB1   0302   '    Initial screen formatting
1CB1   0302   '
1CB1   0302        cls
1CB4   0302   '
1CB4   0302        color 15,4
1CC0   0302        locate 25,1,0
1CD1   0302        print "   F1 = Del  F2 = File  F3 = Quit  F4 = Reset  F7 =
               Bck  F8 = For  F9 = Rotate  ";
1CD8   0302   '
1CD8   0302        COLOR 15,1
1CE4   0302        LOCATE 24,1,0
1CF5   0302        PRINT STRING$(80," ");
1D02   0302   '
1D02   0302        LOCATE 1, 1, 0
1D13   0302        PRINT " ACTN ";
1D1A   0302   '
1D1A   0302        LOCATE 1, 28, 0
1D2B   0302        COLOR 15, 4
1D37   0302        PRINT " ALARM / ACTION DEFINITION ";
1D3E   0302   '
1D3E   0302   '    Put up the message area.
1D3E   0302   '
1D3E   0302        locate 23,1,0
1D4F   0302        color 15,2
1D5B   0302        print " Messages -- ";
1D62   0302   '
1D62   0302   '    Initialize the screenflag, and entryflag to the first scre
              en.
1D62   0302   '
1D62   0302        screenflag = 0
1D68   0304        entryflag = 0
1D6E   0306   '
1D6E   0306   '    Put up the date and the time
1D6E   0306   '
1D6E   0306        gosub 20005
1D72   0306        gosub 20006
1D76   0306   '
1D76   0306        error1 = 0
1D7C   0306        gosub 20700 ' error line display
1D80   0306   '
1D80   0306        color 15,1
1D8C   0306   '
1D8C   0306        return
1D8E   0306   '
1D8E   0306   20005 '
1D8E   0306   '
1D8E   0306   '    Put up the month
1D8E   0306   '
```

```
1D8E   0306        color 15,1
1D9A   0306        locate 1, 72, 0
1DAB   0306        month$ = date$
1DB3   030A        month$ = left$(month$,6) + right$(month$,2)
1DCE   030A        print month$;
1DD5   030A    '
1DD5   030A        return
1DD7   030A    '
1DD7   030A    20006 '
1DD7   030A    '
1DD7   030A    '   Put up the time
1DD7   030A    '
1DD7   030A        color 15,1
1DE3   030A        locate 2, 72, 0
1DF4   030A        print time$;
1DFB   030A    '
1DFB   030A        return
1DFD   030A    '
1DFD   030A    20100 '
1DFD   030A    '
1DFD   030A    '   Get Key input
1DFD   030A    '
1DFD   030A        switch1 = 1
1E03   030C        while switch1
1E0E   030C    '
1E0E   030C            key1$ = inkey$
1E16   030C            if key1$ <> "" then gosub 21001:  gosub 20110 'handle a non-
               blank entry
1E2B   030C            gosub 20006    'time stamp
1E2F   030C    '
1E2F   030C        wend
1E32   030C    '
1E32   030C        return
1E34   030C    '
1E34   030C    20110 '
1E34   030C    '
1E34   030C    '   Get key entry and set extended key appropriately.
1E34   030C    '
1E34   030C        if error1 > 8 then gosub 20600: gosub 20700
1E46   030C    '
1E46   030C    '   Reset the keyboard entry switch
1E46   030C    '
1E46   030C        switch1 = 0
1E4C   030C        if len(key1$) > 1 then extended = 1: key1$ = right$(key1$,
               1) else extended = 0
1E77   030E        key1 = asc(key1$)
1E80   030E    '
1E80   030E    '   If Past the end of the value area then allow only enter, d
               elete or f9
1E80   030E    '
1E80   030E    '   if col1 > endy(fieldptr) then if key1 <> 8 and key1 <> 13
               and key1 <> 67 then error1 = 118: return
1E80   030E    '
1E80   030E    '   Extended Key entry?????????
```

```
1E80   030E    '
1E80   030E        if extended = 1 then gosub 20120 else gosub 20130
1E95   030E    '
1E95   030E    '   Goodkey determines which key was pressed.
1E95   030E    '
1E95   030E    '        goodkey = 1 then letter
1E95   030E    '        goodkey = 2 then dec. pt.
1E95   030E    '        goodkey = 3 then minus sign
1E95   030E    '        goodkey = 4 then number
1E95   030E    '        goodkey = 5 then tab
1E95   030E    '        goodkey = 6 then special character
1E95   030E    '        goodkey = 7 then enter key was pressed
1E95   030E    '        goodkey = 8 then delete key was pressed
1E95   030E    '        goodkey = 9 then space key
1E95   030E    '        goodkey = 10 then valid pfkey
1E95   030E    '
1E95   030E        if col1 > endy(fieldptr) then if goodkey <> 8 and goodkey
               <> 7 and goodkey <> 10 then error1 = 118: return
1EDC   0310    '
1EDC   0310    '   Pfkey, delete or tab key was employed.
1EDC   0310    '
1EDC   0310        if goodkey = 10 or goodkey = 8 or goodkey = 5 then return
1F0A   0310    '
1F0A   0310        if col1 = starty(fieldptr) then gosub 20118
1F21   0310    '
1F21   0310        if goodkey = 7 then j = (temp$ <> "" or nullswitch)
1F41   0310        if goodkey = 7 then if j then gosub 30: return else error1
                = 117: return
1F64   0310        if numflag < 3 then if goodkey > 4 and goodkey < 10 then e
               rror1 = 102: return
1F95   0310    '
1F95   0310        if numflag = 0 then gosub 20112     'Integer checker
1FA3   0310        if numflag = 1 then gosub 20113     'Decimal checker
1FB1   0310        if numflag = 2 then gosub 20114     'Letter checker
1FBF   0310        if numflag = 3 then gosub 20115     'Letter, blank and number
                checker
1FCD   0310    '
1FCD   0310        return
1FCF   0310    '
1FCF   0310    20112 '
1FCF   0310    '
1FCF   0310    '   Integer checker.
1FCF   0310    '
1FCF   0310        if goodkey = 3 and col1 = starty(fieldptr) then goodkey =
               4
1FFD   0310        If goodkey <> 4 then error1 = 102: return
200F   0310    '
200F   0310    '   Put up the key.
200F   0310    '
200F   0310        gosub 20119
2013   0310    '
2013   0310        return
2015   0310    '
2015   0310    20113 '
```

```
2015  0310   '
2015  0310   '   Decimal checker
2015  0310   '
2015  0310       if goodkey = 3 and col1 = starty(fieldptr) then goodkey =
2043  0310   4   if goodkey = 2 then goodkey = 4
2053  0310       If goodkey <> 4 then error1 = 102: return
2065  0310   '
2065  0310   '   Put up the key.
2065  0310   '
2065  0310       gosub 20119
2069  0310   '
2069  0310       return
206B  0310   '
206B  0310   20114 '
206B  0310   '
206B  0310   '   Letter
206B  0310   '
206B  0310   '   The second character on can be a number.
206B  0310   '
206B  0310       if col1 > starty(fieldptr) and goodkey = 4 then goodkey =
             1
2099  0310       if goodkey <> 1 then error1 = 102: return
20AB  0310   '
20AB  0310   '   Put up the key.
20AB  0310   '
20AB  0310       gosub 20119
20AF  0310   '
20AF  0310       return
20B1  0310   '
20B1  0310   20115 '
20B1  0310   '
20B1  0310   '   Special key handler.
20B1  0310   '
20B1  0310       gosub 20119
20B5  0310   '
20B5  0310       return
20B7  0310   '
20B7  0310   20118 '
20B7  0310   '
20B7  0310   '   Blank the field
20B7  0310   '
20B7  0310       x = endy(fieldptr) - col1 + 1
20CA  0310   '
20CA  0310       locate row1, col1, 0
20DD  0310       print string$(x," ");
20EB  0310   '
20EB  0310       return
20ED  0310   '
20ED  0310   20119 '
20ED  0310   '
20ED  0310   '   Handle letters or numbers
20ED  0310   '
20ED  0310       locate row1, col1, 0
```

```
2100  0310        print chr$(key1);
210B  0310        temp$ = temp$ + chr$(key1)
211A  0310        col1 = col1 + 1
2121  0310    '
2121  0310        return
2123  0310    '
2123  0310    20120 '
2123  0310    '
2123  0310    '   Handle extended key entry
2123  0310    '
2123  0310        if key1 = 72 or key1 = 80 then gosub 20160: goto 20121
                'arrow tab
2149  0310        if key1 = 83 then gosub 20140: goto 20121                'delete
215A  0310        if ( key1 > 58 and key1 < 69 ) then gosub 20150: goto 2012
              1    'function keys
2180  0310        if key1 = 15 then gosub 20160: goto 20121                'shift
              tab
2191  0310    '
2191  0310        goodkey = 6
2197  0310    '
2197  0310    20121 '
2197  0310    '
2197  0310        return
2199  0310    '
2199  0310    20130 '
2199  0310    '
2199  0310    '   Handle normal keys
2199  0310    '
2199  0310        if key1 = 8 then goodkey = 8: gosub 20140: goto 20131
               'del
21B0  0310        if key1 = 9 then gosub 20160: goto 20131                 'tab
21C1  0310        if key1 = 32 then goodkey = 9: goto 20131                'space
              key
21D4  0310        if key1 > 96 and key1 < 123 then key1 = key1 and &hffdf
                'capitalize small letters
21FC  0310        if key1 > 64 and key1 < 91 then goodkey = 1: goto 20131
                'capital letters
2224  0310        if key1 = 46 then goodkey = 2: goto 20131                'decima
              l
2237  0310        if key1 = 45 then goodkey = 3: goto 20131                'minus
              sign
224A  0310        if key1 > 47 and key1 < 58 then goodkey = 4: goto 20131
                'number
2272  0310        if key1 = 13 then t1 = screen(row1,col1): color 15,1,0
                'enter key
229F  0310        if key1 = 13 then locate row1, col1, 0: print chr$(t1);
                'enter key
22C7  0310        if key1 = 13 then goodkey = 7: locate row1, col1, 0: goto
              20131  'enter key
22ED  0310    '
22ED  0310        goodkey = 6
22F3  0310    '
22F3  0310    20131 '
22F3  0310    '
```

```
22F3   0310        return
22F5   0310     '
22F5   0310     20140 '
22F5   0310     '
22F5   0310     '    Delete key
22F5   0310     '
22F5   0310         if coll = starty(fieldptr) then error1 = 101: return
2310   0310     '
2310   0310         coll = coll - 1
2317   0310         locate row1, coll, 0
232A   0310         print " ";
2331   0310         locate row1, coll, 0
2344   0310     '
2344   0310     '    Take away the character in temp$
2344   0310     '
2344   0310         i = len(temp$) - 1
234E   0310         temp$ = left$(temp$, i)
235E   0310     '
235E   0310         return
2360   0310     '
2360   0310     20150 '
2360   0310     '
2360   0310     '    Handle PFkeys
2360   0310     '
2360   0310     '
2360   0310         key1 = key1 - 58
2369   0310     '
2369   0310     '                   f1     f2    f3     f4     f5    f6     f
                7     f8     f9
2369   0310     '
2369   0310         on key1 gosub 20300, 20190, 30000, 31300, 31400, 31400, 22
                000, 22010, 20310
2382   0310     '
2382   0310         if key1 > 9 then goodkey = 6 else goodkey = 10
239B   0310     '
239B   0310         return
239D   0310     '
239D   0310     20160 '
239D   0310     '
239D   0310     '    Handle the tab keys
239D   0310     '
239D   0310         goodkey = 5
23A3   0310     '
23A3   0310     '    check location
23A3   0310     '
23A3   0310         if fieldptr = 0 and screenname$ = "" then error1 = 60: retu
                rn
23CF   0310     '
23CF   0310         if key1 = 72 then extended = 1
23DF   0310         if key1 = 80 then extended = 0
23EF   0310     '
23EF   0310     '    Keep the user in the correct area.
23EF   0310     '    Do not allow forward movement into a new area on the logic
                al group and digital out
```

```
23EF  0310   '    without completion of the previous field.
23EF  0310   '
23EF  0310        if logicalscreen = 1 then if extended = 0 then if fieldptr
              = pagetwo + 1 then error1 = 136: return
2419  0310        if logicalscreen = 3 then if extended = 0 then if fieldptr
              = pagefour + 1 then error1 = 136: return
2443  0310   '
2443  0310        if extended = 1 then fieldptr = fieldptr - 1: goodentries
             = goodentries - 1
245B  0312        if extended = 0 then fieldptr = fieldptr + 1: goodentries
             = goodentries + 1
2473  0312   '
2473  0312   '    Check the position of the fieldptr and the logical screen.
2473  0312   '
2473  0312        returncode = 0
2479  0312        gosub 32
247D  0312   '
247D  0312        return
247F  0312   '
247F  0312   20180 '
247F  0312   '
247F  0312   '    Screen Changing routine.
247F  0312   '
247F  0312        if fieldptr = 0 then logicalscreen = 0
248F  0312        if fieldptr = 1 then logicalscreen = 1
249F  0312        if fieldptr = 16 then logicalscreen = 2
24AF  0312        if fieldptr = 24 then logicalscreen = 3
24BF  0312   '
24BF  0312   '    Put up the new screens
24BF  0312   '
24BF  0312        if logicalscreen = 0 then gosub 20000: gosub 20350  'displ
             ay prompts for first screen.
24D1  0312        if logicalscreen = 1 then gosub 20000: gosub 20400  'displ
             ay prompts for second screen.
24E3  0312        if logicalscreen = 2 then gosub 20000: gosub 20450  'displ
             ay prompts for third screen.
24F5  0312        if logicalscreen = 3 then gosub 20000: gosub 20500  'displ
             ay prompts for the fourth screen.
2507  0312   '
2507  0312   '    Check the field pointer.
2507  0312   '
2507  0312        if fieldptr < 0 then fieldptr = 0
2517  0312   '
2517  0312   '    Set the switches properly.
2517  0312   '
2517  0312        gosub 34
251B  0312   '
251B  0312        gosub 20200 'Put up any already entered items.
251F  0312   '
251F  0312        return
2521  0312   '
2521  0312   20190 '
2521  0312   '
2521  0312   '    f2 Routine
```

```
2521   0312   '
2521   0312       if logicalscreen = 1 then if logic(0) <> 0 then fieldptr =
             16 else error1 = 122: return
2546   0312       if logicalscreen = 2 then fieldptr = 24
2556   0312       if logicalscreen = 3 then fieldptr = 0: gosub 25000: gosub
             34: badinput = 0: return
2576   0312   '
2576   0312       gosub 20180
257A   0312   '
257A   0312       gosub 35
257E   0312   '
257E   0312       gosub 36
2582   0312   '
2582   0312       return
2584   0312   '
2584   0312   20200 '
2584   0312   '
2584   0312   '   Subroutine to put up already existing items.
2584   0312   '
2584   0312       if logicalscreen = 0 then gosub 20210
2592   0312       if logicalscreen = 1 then gosub 20220
25A0   0312       if logicalscreen = 2 then gosub 20230
25AE   0312       if logicalscreen = 3 then gosub 20240
25BC   0312   '
25BC   0312       return
25BE   0312   '
25BE   0312   20210 '
25BE   0312   '
25BE   0312   '   Put up the screen name
25BE   0312   '
25BE   0312       fieldptr = 0
25C4   0312       gosub 36
25C8   0312   '
25C8   0312       return
25CA   0312   '
25CA   0312   20220 '
25CA   0312   '
25CA   0312   '   Put up page two of data
25CA   0312   '
25CA   0312       for fieldptr = 1 to 15
25D0   0312   '
25D0   0312           gosub 36
25D4   0312           if logic( fieldptr - 1 ) <> 0 then pagetwo = fieldptr
25EA   0312   '
25EA   0312       next
25FB   0312   '
25FB   0312       fieldptr = 1
25FE   0312       if pagetwo > 0 then fieldptr = pagetwo + 1
260F   0312       if fieldptr > 15 then fieldptr = 15
261F   0312   '
261F   0312       return
2621   0312   '
2621   0312   20230 '
2621   0312   '
```

```
2621  0312   '   Put up page three of data
2621  0312   '
2621  0312       for fieldptr = 16 to 23
2627  0312   '
2627  0312           gosub 36
262B  0312   '
262B  0312       next
2639  0312   '
2639  0312       fieldptr = 16
263F  0312   '
263F  0312       return
2641  0312   '
2641  0312   20240 '
2641  0312   '
2641  0312   '   Put up page four data
2641  0312   '
2641  0312       for fieldptr = 24 to 31
2647  0312   '
2647  0312           gosub 36
264B  0312           if digitalout( fieldptr - 24 ) <> 0 then pagefour = fieldptr
2661  0312   '
2661  0312       next
266F  0312   '
266F  0312       fieldptr = 24
2675  0312       if pagefour > 0 then fieldptr = pagefour + 1
2686  0312       if fieldptr > 31 then fieldptr = 31
2696  0312   '
2696  0312       return
2698  0312   '
2698  0312   20300 '
2698  0312   '
2698  0312   '   Delete an entry
2698  0312   '
2698  0312       oldmessage = error1
269E  0314       error1 = 4
26A4  0314       gosub 20700
26A8  0314   '
26A8  0314       row1 = 23
26AE  0314       col1 = 66
26B4  0314       gosub 21000 'turn on the blink
26B8  0314   '
26B8  0314       rotate12 = 0
26BE  0314       temp$ = "1"
26C6  0314       color 15, 1, 0
26D7  0314   '
26D7  0314       while key1 <> 13
26E1  0314   '
26E1  0314           key1$ = inkey$
26E9  0314           if key1$ = "" then goto 20301
26F9  0314   '
26F9  0314           if len(key1$) > 1 then key1$ = right$(key1$,1)
2715  0314           key1 = asc(key1$)
271E  0314           locate row1,col1,0
2731  0314   '
```

```
2731  0314   '        rotate key
2731  0314   '
2731  0314            if key1 = 67 then if temp$ = "1" then temp$ = "2" else temp$
             = "1"
275B  0314   '        1 or 2 entered
275B  0314   '
275B  0314            if key1 = 49 or key1 = 50 then: temp$ = key1$: goto 20301
2785  0314   '
2785  0314   '        enter key pressed
2785  0314   '
2785  0314            if key1 = 13 then if temp$ = "1" then gosub 20305: goto 2030
             1
27A3  0314            if key1 = 13 then if temp$ = "2" then gosub 20308: goto 2030
             1
27C1  0314   '
27C1  0314   '        illegal key entered
27C1  0314   '
27C1  0314            beep
27C4  0314   '
27C4  0314   20301 '
27C4  0314   '
27C4  0314            if key1$ <> "" then print temp$;
27DB  0314   '
27DB  0314        wend
27DB  0314   '
27DB  0314        key1 = 1
27E1  0314        row1 = startx(fieldptr)
27EE  0314        col1 = starty(fieldptr)
27FB  0314   '
27FB  0314        return
27FD  0314   '
27FD  0314   20305 '
27FD  0314   '
27FD  0314   '    Delete the entry
27FD  0314   '
27FD  0314   '    Determine which entry was deleted and do clean-up if neces
             sary.
27FD  0314   '
27FD  0314        gosub 20306
2801  0314   '
2801  0314        error1 = oldmessage
2807  0314        gosub 20700
280B  0314   '
280B  0314        gosub 36
280F  0314   '
280F  0314        return
2811  0314   '
2811  0314   20306 '
2811  0314   '
2811  0314   '    Determine the entry to delete and cleanup if necessary.
2811  0314   '
2811  0314        if fieldptr = 0 then screenname$ = ""
2823  0314   '
```

```
2823   0314        if fieldptr = 16 then message1$ = ""
2835   0314        if fieldptr = 17 then message2$ = ""
2847   0314        if fieldptr = 18 then message3$ = ""
2859   0314    '
2859   0314        if fieldptr = 19 then ehe = 0
2869   0314        if fieldptr = 20 then alarmfun = 0
2879   0314        if fieldptr = 21 then aalarm = 0
2889   0314        if fieldptr = 22 then resetimer = 0
2899   0314        if fieldptr = 23 then startimer = 0
28A9   0314    '
28A9   0314        f1 = fieldptr
28AF   0316    '
28AF   0316        if f1 < 1 or f1 > 15 then goto 20307
28D1   0316    '
28D1   0316        for imb2 = 0 to 14
28D6   0316            if imb2 + 1 = f1 then logic( imb2 ) = 0
28F0   0318            if logic(imb2) = 0 and pagetwo => imb2 + 1 then logic(imb2)
               = logic(imb2 + 1): logic(imb2 + 1) = 0
2931   0318            fieldptr = imb2 + 1: gosub 36
293C   0318    '
293C   0318        next
294A   0318        pagetwo = pagetwo - 1
2951   0318    '
2951   0318        fieldptr = pagetwo + 1
2958   0318    '
2958   0318        return
295A   0318    '
295A   0318    20307 '
295A   0318    '
295A   0318        if f1 < 24 or f1 > 31 then fieldptr = f1: return
2981   0318    '
2981   0318        for imb2 = 0 to 7
2986   0318            if imb2 + 24 = f1 then digitalout(imb2) = 0
29A2   0318            if digitalout(imb2) = 0 and pagefour => imb2 + 24 then digit
               alout(imb2) = digitalout(imb2 + 1): digitalout(imb2 + 1) = 0
29E5   0318            fieldptr = imb2 + 24: gosub 36
29F2   0318        next
2A00   0318    '
2A00   0318        pagefour = pagefour - 1
2A07   0318    '
2A07   0318        fieldptr = pagefour + 1
2A0E   0318    '
2A0E   0318        return
2A10   0318    '
2A10   0318    20308 '
2A10   0318    '
2A10   0318    '   delete the action screen entry.
2A10   0318    '
2A10   0318        if oldentry > 0 then gosub 20309
2A1E   0318        error1 = 0
2A24   0318        fieldptr = 0
2A2A   0318        badinput = 0
2A30   0318    '
2A30   0318        gosub 34
```

```
2A34  0318   '
2A34  0318       return
2A36  0318   '
2A36  0318   20309 '
2A36  0318   '
2A36  0318   '   Delete the message entries and name entries
2A36  0318   '
2A36  0318       lset message$ = "@#$%!"
2A3E  0318       lset nameentry$ = "@#$%!"
2A46  0318   '
2A46  0318       i = cvi(r$)
2A50  0318       if i <> -1 then put #3, i
2A64  0318   '
2A64  0318       i = cvi(s$)
2A6E  0318       if i <> -1 then put #3, i
2A82  0318   '
2A82  0318       i = cvi(t$)
2A8C  0318       if i <> -1 then put #4, i
2AA0  0318   '
2AA0  0318   '   Reset the entry field
2AA0  0318   '
2AA0  0318       lset a$ = mki$(-1)
2AAB  0318       put #2, oldentry
2AB5  0318   '
2AB5  0318       numsrecs = numsrecs - 1
2ABC  0318   '
2ABC  0318       return
2ABE  0318   '
2ABE  0318   20310 '
2ABE  0318   '
2ABE  0318   '   Select the correct list to display.
2ABE  0318   '
2ABE  0318       If rotateswitch = 0 then errorl = 113: return
2AD0  0318       If rotateswitch = 1 then gosub 20311
2ADE  0318       If rotateswitch = 2 then gosub 20315
2AEC  0318       if rotateswitch = 3 then gosub 20320
2AFA  0318       if rotateswitch = 4 then gosub 20330
2B08  0318       if rotateswitch = 5 then typevar = 2: gosub 20340
2B1C  031A       if rotateswitch = 6 then typevar = 4: gosub 20340
2B30  031A   '
2B30  031A       return
2B32  031A   '
2B32  031A   20311 '
2B32  031A   '
2B32  031A   '   Rotate the screen names.
2B32  031A   '
2B32  031A       if numsrecs = 0 then errorl = 114: return
2B44  031A   '
2B44  031A       screenselect = screenselect + 1
2B4B  031A       if screenselect > 200 then screenselect = 2
2B5C  031A   '
2B5C  031A       max = 200
2B62  031C       for j = 0 to 1
2B67  031C   '
```

```
2B67   031C          for i = screenselect to max
2B73   031E               get #2, i
2B7D   031E               in1 = cvi(a$): if in1 <> -1 then 20312
2B91   0320          next i
2BA1   0320          max = screenselect
2BA7   0320          screenselect = 2
2BAD   0320    '
2BAD   0320       next j
2BBB   0320    '
2BBB   0320       error1 = 114
2BC1   0320       return
2BC3   0320    '
2BC3   0320    20312 '
2BC3   0320       temp$ = b$
2BCB   0320    '
2BCB   0320       gosub 20319
2BCF   0320    '
2BCF   0320       return
2BD1   0320    '
2BD1   0320    20315 '
2BD1   0320    '
2BD1   0320    '   Rotate the variable names.
2BD1   0320    '
2BD1   0320       if numrecs = 0 then error1 = 115: return
2BE3   0320    '
2BE3   0320       variableselect = variableselect + 1
2BEA   0320       if variableselect > 200 then variableselect = 2
2BFB   0320    '
2BFB   0320       max = 200
2C01   0320       for j = 0 to 1
2C06   0320    '
2C06   0320          for i = variableselect to max
2C12   0322               get #1, i
2C1C   0322               in1 = cvi(senseup$): if in1 <> -1 then 20317
2C30   0322          next i
2C40   0322          max = variableselect
2C46   0322          variableselect = 2
2C4C   0322    '
2C4C   0322       next j
2C5A   0322    '
2C5A   0322       error1 = 115
2C60   0322       return
2C62   0322    '
2C62   0322    20317 '
2C62   0322       temp$ = varup$
2C6A   0322    '
2C6A   0322       gosub 20319
2C6E   0322    '
2C6E   0322       return
2C70   0322    '
2C70   0322    20319 '
2C70   0322    '
2C70   0322    '   Put the name on the screen
2C70   0322    '
```

```
2C70   0322        col1 = starty(fieldptr)
2C7D   0322        locate row1, col1, 0
2C90   0322        color 15,1,0
2CA1   0322        print temp$;
2CA8   0322        col1 = col1 + len(temp$)
2CB5   0322        locate row1, col1, 0
2CC8   0322   '
2CC8   0322        return
2CCA   0322   '
2CCA   0322   20320 '
2CCA   0322   '
2CCA   0322   '    Rotate Y or N
2CCA   0322   '
2CCA   0322        if rotateyn = 0 then temp$ = "Y": rotateyn = 1 else temp$
              = "N": rotateyn = 0
2CF3   0322   '
2CF3   0322        gosub 20321
2CF7   0322   '
2CF7   0322        return
2CF9   0322   '
2CF9   0322   20321 '
2CF9   0322   '
2CF9   0322   '    Put up one chararcter of rotation.
2CF9   0322   '
2CF9   0322        color 15,1,0
2D0A   0322   '
2D0A   0322        col1 = starty(fieldptr)
2D17   0322        locate row1, col1, 0
2D2A   0322        print temp$;
2D31   0322        col1 = starty(fieldptr) + len(temp$)
2D45   0322   '
2D45   0322        return
2D47   0322   '
2D47   0322   20330 '
2D47   0322   '
2D47   0322   '    Rotate 1 or 2
2D47   0322   '
2D47   0322        if rotate12 = 0 then temp$ = "2": rotate12 = 1 else temp$
              = "1": rotate12 = 0
2D70   0322   '
2D70   0322        gosub 20321
2D74   0322   '
2D74   0322        return
2D76   0322   '
2D76   0322   20340 '
2D76   0322   '
2D76   0322   '    Rotate the digital out variable names.
2D76   0322   '
2D76   0322        if numrecs = 0 then error1 = 115: return
2D88   0322   '
2D88   0322        looper = 1
2D8E   0324        count = 0
2D94   0326
2D94   0326   '
```

```
2D94   0326        while looper
2D9F   0326    '
2D9F   0326            count = count + 1
2DA6   0326            variableselect = variableselect + 1
2DAD   0326            if variableselect > numrecs + 1 then variableselect = 2
2DC1   0326    '
2DC1   0326            get #1, variableselect
2DCB   0326            sensor = cvi(senseup$)
2DD5   0326            if sensor = typevar then looper = 0
2DE7   0326            if count > numrecs then looper = 0: error1 = 124
2DFF   0326    '
2DFF   0326        wend
2E02   0326    '
2E02   0326        temp$ = varup$
2E0A   0326    '
2E0A   0326        gosub 20319
2E0E   0326    '
2E0E   0326        return
2E10   0326    '
2E10   0326    20350 '
2E10   0326    '
2E10   0326    '   Put up the first screen.
2E10   0326    '
2E10   0326        locate 12, 26, 0
2E21   0326        color 15,1,0
2E32   0326        print " Action Name [          ] ";
2E39   0326        color 15, 1, 0
2E4A   0326    '
2E4A   0326        return
2E4C   0326    '
2E4C   0326    20400 '
2E4C   0326    '
2E4C   0326    '   Logical definition of var's and their states
2E4C   0326    '
2E4C   0326        locate 3,1,0
2E5D   0326        color 15,4,0
2E6E   0326        print " VARIABLE NAME    ";
2E75   0326    '
2E75   0326        locate 3, 22, 0
2E86   0326        print "  =========== ANALOG or DI ===========  ";
2E8D   0326    '
2E8D   0326        locate 3, 63, 0
2E9E   0326        print "  == DIGITAL == ";
2EA5   0326    '
2EA5   0326        locate 4, 22, 0
2EB6   0326        color 15,2
2EC2   0326        print "HIALARM HIWARN RATEOFCHG LOWALARM LOWWARN ZERO
               ONE     ";
2EC9   0326    '
2EC9   0326        color 15,1 , 0
2EDA   0326    '
2EDA   0326        for i = 0 to  14
2EDF   0326            locate i + 6,1,0
2EF4   0326            print i+1;
```

```
2EFD   0326            locate i+6, 4,0
2F12   0326            print ") [ '       ]  ";
2F19   0326        next
2F27   0326    '
2F27   0326        return
2F29   0326    '
2F29   0326    20450 '
2F29   0326    '
2F29   0326    '   Put up the third screen.
2F29   0326    '
2F29   0326        color 15, 2, 0
2F3A   0326        locate 4, 19, 0
2F4B   0326        print " MESSAGE TO APPEAR ON USER DEFINED SCREEN ";
2F52   0326    '
2F52   0326        color 15,1,0
2F63   0326        locate 6, 18, 0
2F74   0326        print " [                                      ] ";
2F7B   0326    '
2F7B   0326        color 15, 2, 0
2F8C   0326        locate 9, 17, 0
2F9D   0326        print " MESSAGE TO APPEAR ON THE BOTTOM OF THE SCREEN ";
2FA4   0326    '
2FA4   0326        color 15,1,0
2FB5   0326        locate 11, 18, 0
2FC6   0326        print " [                                      ] ";
2FCD   0326    '
2FCD   0326        color 15, 2, 0
2FDE   0326        locate 14, 16, 0
2FEF   0326        print " NAME OF THE NEW SCREEN TO APPEAR:  ";
2FF6   0326
2FF6   0326    '
2FF6   0326        color 15,1,0
3007   0326        locate 14, 53, 0
3018   0326        print " [        ] ";
301F   0326    '
301F   0326        color 15, 2, 0
3030   0326        locate 16, 12, 0
3041   0326        print " EVENT HISTORY ENTRY";
304B   0326    '
304B   0326        color 15,1,0
3059   0326        locate 16, 33, 0
306A   0326        print " Y/N [N]";
3071   0326    '
3071   0326        color 15, 2, 0
3082   0326        locate 16,42,0
3093   0326        print " ALARMABLE FUNCTION";
309A   0326    '
309A   0326        color 15,1,0
30AB   0326        locate 16, 61, 0
30BC   0326        print " Y/N [N]";
30C3   0326    '
30C3   0326        color 15, 2, 0
30D4   0326        locate 18, 14, 0
30E5   0326        print " AUDIBLE ALARM";
```

```
30EC  0326   '
30EC  0326        color 15,1,0
30FD  0326        locate 18, 28, 0
310E  0326        print " 1 = SHORT 2 = UNTIL ACKNOWLEDGED [1] ";
3115  0326   '
3115  0326        color 15,2,0
3126  0326        locate 20, 16,0
3137  0326        print " RESET TIMER [        ]  START TIMER [        ] ";
313E  0326   '
313E  0326        color 15,1,0
314F  0326        locate 20,28,0
3160  0326        print " [        ] ";
3167  0326   '
3167  0326        locate 20,52,0
3178  0326        print " [        ] ";
317F  0326   '
317F  0326        return
3181  0326   '
3181  0326   20500 '
3181  0326   '
3181  0326   '    Digital Out screen.
3181  0326   '
3181  0326        locate 4,1,0
3192  0326        color 15,4,0
31A3  0326        print " VARIABLE NAME    ";
31AA  0326   '
31AA  0326        color 15, 0, 0
31BA  0326        locate 4, 19, 0
31CB  0326        print " DIGITAL OUT STATUS MESSAGES ============  ";
31D2  0326   '
31D2  0326        locate 4, 62, 0
31E3  0326        color 15,2
31EF  0326        print " ZERO     ONE      ";
31F6  0326   '
31F6  0326        color 15,1 , 0
3207  0326   '
3207  0326        for i = 0 to  7
320C  0326            locate i + 7,1,0
3221  0326            print i+1;
322A  0326            locate i+7, 3,0
323F  0326            print ")  [        ]  ";
3246  0326        next
3254  0326   '
3254  0326        return
3256  0326   '
3256  0326   20600 '
3256  0326   '
3256  0326   '    Error code checker for the fields.
3256  0326   '
3256  0326        error1 = 0
325C  0326        if fieldptr > 0 and fieldptr < 16 then error1 = 3
3281  0326        if fieldptr = 16 or fieldptr = 17 then error1 = 5
32A6  0326        if fieldptr = 18 then error1 = 6
32B6  0326        if fieldptr > 18 and fieldptr < 22 then error1 = 7
```

```
32DB    0326        if fieldptr = 22 or fieldptr = 23 then error1 = 1
3300    0326        if fieldptr > 24 then error1 = 8
3310    0326    '
3310    0326        return
3312    0326    '
3312    0326    20700 '
3312    0326    '
3312    0326    '   Error Handler
3312    0326    '
3312    0326        locate 23, 15, 0
3323    0326        color 1,15
332F    0326    '
332F    0326        print string$(66," ");
333C    0326    '
333C    0326    '   Error message code here
333C    0326    '
333C    0326        locate 23, 15, 0
334D    0326        color 0,15
3358    0326    '
3358    0326        if error1 = 0 then print " Fill in the action name or F9 f
                or rotate and press ——┘ ";
3369    0326        if error1 = 1 then print " Fill in the timer name or F9 fo
                r rotate and press ——┘ ";
337A    0326        if error1 = 3 then print " Fill in the variable name or F9
                 for rotate and press ——┘. ";
338B    0326        if error1 = 4 then print " Delete <1> entry or <2> whole a
                ction definition? [1] ";
339C    0326        if error1 = 5 then print " Fill in the message and press
                ——┘. ";
33AD    0326        if error1 = 6 then print " Fill in the Display name and pr
                ess ——┘. ";
33BE    0326        if error1 = 7 then print " Fill in the entry, or F9 for ro
                tate and press ——┘. ";
33CF    0326        if error1 = 8 then print " Fill in the Digital Out, or F9
                for rotate and press ——┘. ";
33E0    0326        if error1 = 9 then print " Tab to appropriate state and pr
                ess ——┘. ";
33F1    0326        if error1 = 51 then print " *** No Variable file found, ru
                n < VARINIT > ";
3402    0326        if error1 = 52 then print " *** System error of unknown ca
                use. ";
3413    0326        if error1 = 53 then print " *** No Screen file found, run
                < SCRINIT > ";
3424    0326        if error1 = 54 then print " *** No Message file found, run
                 < MESSINIT > ";
3435    0326        if error1 = 55 then print " *** No Name file found, run <
                NAMEINIT > ";
3446    0326        if error1 = 58 then print " *** Variable name specified wa
                s not found in the variable file ";
3457    0326        if error1 = 59 then print " *** Variable name was not a di
                gital out, please re-enter. ";
3468    0326        if error1 = 60 then print " *** The action name must be fi
                lled in before proceeding. ";
3479    0326        if error1 = 61 then color 16,15: print " *****************
```

```
                 ######### EXECUTING ############################ ";
3496   0326         if error1 = 101 then print " ### Delete key is positioned
                 invalidly for deletion. ";
34A7   0326         if error1 = 102 then print " ### Invalid Key Was Selected
                 ";
34B8   0326         if error1 = 104 then print " ### Integer Quanity Was Out O
                 f Range, Please Re-Enter ";
34C9   0326         if error1 = 106 then print " ### Invalid Real Number Was E
                 ntered, Please Re-enter ";
34DA   0326         if error1 = 109 then print " ### No Digital Out by that na
                 me was found, Please Re-enter ";
34EB   0326         if error1 = 110 then print " ### No fields have been updat
                 ed yet, Please Re-enter ";
34FC   0326         if error1 = 111 then print " ### Screen name cannot be a v
                 ariable's name. ";
350D   0326         if error1 = 113 then print " ### Rotate is not appropriate
                  for this field. ";
351E   0326         if error1 = 114 then print " ### There are no names to rot
                 ate in the screen file. ";
352F   0326         if error1 = 115 then print " ### There are no names to rot
                 ate in the variable file. ";
3540   0326         if error1 = 117 then print " ### A null name is not allowe
                 d. ";
3551   0326         if error1 = 118 then print " ### Press ——┘ when field i
                 s filled in correctly. ";
3562   0326         if error1 = 120 then print " ### Incorrect key entry for h
                 elp try F9. ";
3573   0326         if error1 = 122 then print " ### At least one state must b
                 e defined. ";
3584   0326         if error1 = 123 then print " ### You must create a screen
                 first. ";
3595   0326         if error1 = 124 then print " ### There are no Digital outs
                  in the variable file. ";
35A6   0326         if error1 = 126 then print " ### Press F2 if the screen is
                  filled out properly. ";
35B7   0326         if error1 = 136 then print " ### Fill in a variable name a
                 nd press ——┘ before tabbing. ";
35C9   0326         if error1 = 150 then print " ### Variable was deleted from
                  the variable file.  ";
35DB   0326         if error1 = 151 then print " ### Screen file is full. ";
35ED   0326         if error1 = 152 then print " ### Message file is full. ";
35FF   0326         if error1 = 153 then print " ### Name file is full. ";
3611   0326         if error1 = 154 then print " ### Final screen, press F2 to
                  file ";
3623   0326         if error1 = 160 then print " ### Variable name was not a t
                 imer variable.  Please re-enter. ";
3635   0326      '
3635   0326         if error1 > 10 then beep
3642   0326      '
3642   0326         color 15,1
364E   0326      '
364E   0326         return
3650   0326      '
3650   0326      21000 '
```

```
3650  0326   '
3650  0326   '    Turn on the blinking cursor
3650  0326   '
3650  0326        color 17, 15
365C  0326        temp1 = screen( row1, col1 )
366E  0328        locate row1, col1, 0
3681  0328        print chr$(temp1);
368C  0328        color 15, 1
3698  0328   '
3698  0328        return
369A  0328   '
369A  0328   21001 '
369A  0328   '
369A  0328   '    Turn off the blinking cursor
369A  0328   '
369A  0328        color 15, 1
36A6  0328        temp1 = screen( row1, col1 )
36B8  0328        locate row1, col1, 0
36CB  0328        print chr$(temp1);
36D6  0328   '
36D6  0328        return
36D8  0328   '
36D8  0328   '
36D8  0328   '    Data fields for the screen
36D8  0328   '
36D8  0328   '    first field  = starting cursor location  x,y
36D8  0328   '
36D8  0328   '    second field = ending cursor location    x
36D8  0328   '
36D8  0328   '    starting cursor   ending cursor
36D8  0328   '        x,  y,            x
36D8  0328   '
36D8  0328   '    Page 1
36D8  0328   '
36D8  0328   '0 Action Name
36D8  0328   '
36D8  0328        data 12, 40,          47
36D9  0328   '
36D9  0328   '    Page 2
36D9  0328   '
36D9  0328   '1 LG 1
36D9  0328   '
36D9  0328        data 6,   7,          14
36DA  0328   '
36DA  0328   '2 LG 2
36DA  0328   '
36DA  0328        data 7,   7,          14
36DB  0328   '
36DB  0328   '3 LG 3
36DB  0328   '
36DB  0328        data 8,   7,          14
36DC  0328   '
36DC  0328   '4 LG 4
36DC  0328   '
```

```
36DC   0328        data 9,   7,          14
36DD   0328   '
36DD   0328   '5 LG 5
36DD   0328   '
36DD   0328        data 10,  7,          14
36DE   0328   '
36DE   0328   '6 LG 6
36DE   0328   '
36DE   0328        data 11,  7,          14
36DF   0328   '
36DF   0328   '7 LG 7
36DF   0328   '
36DF   0328        data 12,  7,          14
36E0   0328   '
36E0   0328   '8 LG 8
36E0   0328   '
36E0   0328        data 13,  7,          14
36E1   0328   '
36E1   0328   '9 LG 9
36E1   0328   '
36E1   0328        data 14,  7,          14
36E2   0328   '
36E2   0328   '10 LG 10
36E2   0328   '
36E2   0328        data 15,  7,          14
36E3   0328   '
36E3   0328   '11 LG 11
36E3   0328   '
36E3   0328        data 16,  7,          14
36E4   0328   '
36E4   0328   '12 LG 12
36E4   0328   '
36E4   0328        data 17,  7,          14
36E5   0328   '
36E5   0328   '13 LG 13
36E5   0328   '
36E5   0328        data 18,  7,          14
36E6   0328   '
36E6   0328   '14 LG 14
36E6   0328   '
36E6   0328        data 19,  7,          14
36E7   0328   '
36E7   0328   '15 LG 15
36E7   0328   '
36E7   0328        data 20,  7,          14
36E8   0328   '
36E8   0328   '
36E8   0328   '    Page 3
36E8   0328   '
36E8   0328   '
36E8   0328   '16 User message for screen
36E8   0328   '
36E8   0328        data  6,  20,         59
36E9   0328   '
```

```
36E9   0328   '17 Bottom of the screen message
36E9   0328   '
36E9   0328       data 11,  20,         59
36EA   0328   '
36EA   0328   '18 Name of the Full Screen to appear.
36EA   0328   '
36EA   0328       data 14,  55,         62
36EB   0328   '
36EB   0328   '19 Event History File
36EB   0328   '
36EB   0328       data 16,  39,         39
36EC   0328   '
36EC   0328   '20 Alarmable Function????
36EC   0328   '
36EC   0328       data 16,  67,         67
36ED   0328   '
36ED   0328   '21 Audible Alarm
36ED   0328   '
36ED   0328       data 18,  63,         63
36EE   0328   '
36EE   0328   '22 Reset Timer Name
36EE   0328   '
36EE   0328       data 20,  30,         37
36EF   0328   '
36EF   0328   '23 Start Timer Name
36EF   0328   '
36EF   0328       data 20,  54,         61
36F0   0328   '
36F0   0328   '    Fourth screen
36F0   0328   '
36F0   0328   '24 DO 1
36F0   0328   '
36F0   0328       data 7,   7,          14
36F1   0328   '
36F1   0328   '25 DO 2
36F1   0328   '
36F1   0328       data 8,   7,          14
36F2   0328   '
36F2   0328   '26 DO 3
36F2   0328   '
36F2   0328       data 9,   7,          14
36F3   0328   '
36F3   0328   '27 DO 4
36F3   0328   '
36F3   0328       data 10,  7,          14
36F4   0328   '
36F4   0328   '28 DO 5
36F4   0328   '
36F4   0328       data 11,  7,          14
36F5   0328   '
36F5   0328   '29 DO 6
36F5   0328   '
36F5   0328       data 12,  7,          14
36F6   0328   '
```

```
36F6   0328   '30 DO 7
36F6   0328   '
36F6   0328       data 13,  7,          14
36F7   0328   '
36F7   0328   '31 DO 8
36F7   0328   '
36F7   0328       data 14,  7,          14
36F8   0328   '
36F8   0328   '32 end record
36F8   0328   '
36F8   0328       data -1
36F9   0328   '
36F9   0328   '   end of the data
36F9   0328   '
36F9   0328   22000 '
36F9   0328   '
36F9   0328   '   Page backward.
36F9   0328   '
36F9   0328       logicalscreen = logicalscreen - 1
3700   0328       if logicalscreen < 0 then logicalscreen = 0
3710   0328   '
3710   0328       gosub 22005
3714   0328   '
3714   0328       gosub 20180
3718   0328   '
3718   0328       gosub 32
371C   0328   '
371C   0328       return
371E   0328   '
371E   0328   22010 '
371E   0328   '
371E   0328   '   Page FORWARD
371E   0328   '
371E   0328       logicalscreen = logicalscreen + 1
3725   0328       if logicalscreen > 3 then logicalscreen = 3: error1 = 154
373B   0328   '
373B   0328       gosub 22005
373F   0328   '
373F   0328       gosub 20180
3743   0328   '
3743   0328       gosub 32
3747   0328   '
3747   0328       return
3749   0328   '
3749   0328   22005 '
3749   0328   '
3749   0328   '   set fieldptr appropriately
3749   0328   '
3749   0328       fieldptr = logicalscreen
374F   0328       if logicalscreen = 2 then fieldptr = 16
375F   0328       if logicalscreen = 3 then fieldptr = 24
376F   0328   '
376F   0328       return
3771   0328   '
```

```
3771  0328   25000 '
3771  0328   '
3771  0328   '    Get a free entry or put up old entry.
3771  0328   '
3771  0328        if oldentry = 0 then gosub 25100 else putrecord = oldentry
3788  032A      · if error1 = 151 then return
3795  032A   '
3795  032A   '    First page of data.
3795  032A   '
3795  032A   '
3795  032A        lset b$ = screename$
379D  032A   '
379D  032A   '    Second page of data.
379D  032A   '
379D  032A        lset c$ = mki$(logic(0))
37A9  032A   '
37A9  032A        lset d$ = mki$(logic(1))
37B5  032A   '
37B5  032A        lset e$ = mki$(logic(2))
37C1  032A   '
37C1  032A        lset f$ = mki$(logic(3))
37CD  032A   '
37CD  032A        lset g$ = mki$(logic(4))
37D9  032A   '
37D9  032A        lset h$ = mki$(logic(5))
37E5  032A   '
37E5  032A        lset i$ = mki$(logic(6))
37F1  032A   '
37F1  032A        lset j$ = mki$(logic(7))
37FD  032A   '
37FD  032A        lset k$ = mki$(logic(8))
3809  032A   '
3809  032A        lset l$ = mki$(logic(9))
3815  032A   '
3815  032A        lset m$ = mki$(logic(10))
3821  032A   '
3821  032A        lset n$ = mki$(logic(11))
382D  032A   '
382D  032A        lset o$ = mki$(logic(12))
3839  032A   '
3839  032A        lset p$ = mki$(logic(13))
3845  032A   '
3845  032A        lset q$ = mki$(logic(14))
3851  032A   '
3851  032A   '    Third page of data
3851  032A   '
3851  032A   '
3851  032A   '    User screen message number.
3851  032A   '
3851  032A        if message1$ = "" then foundflag = -1 else gosub 25110
386B  032A        if error1 = 152 then return
3878  032A        if oldentry <> 0 then if cvi(r$) <> -1 then foundflag = cv
             i(r$)
389A  032A        lset r$ = mki$(foundflag)
```

```
38A6   032A        lset message$ = message1$
38AE   032A        if foundflag <> -1 then put #3, foundflag
38C2   032A   '
38C2   032A   '    Bottom of the screen message number.
38C2   032A   '
38C2   032A        if message2$ = "" then foundflag = -1 else gosub 25110
38DC   032A        if error1 = 152 then return
38E9   032A        if oldentry <> 0 then if cvi(s$) <> -1 then foundflag = cv
              i(s$)
390B   032A        lset s$ = mki$(foundflag)
3917   032A        lset message$ = message2$
391F   032A        if foundflag <> - 1 then put #3, foundflag
3933   032A   '
3933   032A   '    Full screen message name number.
3933   032A   '
3933   032A   '    Name type =
3933   032A   '                1) fullscreen help file
3933   032A   '
3933   032A        if message3$ = "" then foundflag = -1 else gosub 25120
394D   032A        if error1 = 153 then return
395A   032A        if oldentry <> 0 then if cvi(t$) <> -1 then foundflag = cv
              i(t$)
397C   032A        lset t$ = mki$(foundflag)
3988   032A        lset nameentry$ = message3$
3990   032A        lset nametype$ = mki$(1)
399B   032A        if foundflag <> -1 then put #4, foundflag
39AF   032A   '
39AF   032A   '    Event history file switch.
39AF   032A   '
39AF   032A        lset u$ = mki$(ehe)
39BB   032A   '
39BB   032A   '    Alarmable function?????
39BB   032A   '
39BB   032A        lset v$ = mki$(alarmfun)
39C7   032A   '
39C7   032A   '    Audible horn switch
39C7   032A   '
39C7   032A        lset w$ = mki$(aalarm)
39D3   032A   '
39D3   032A   '    Reset timer
39D3   032A   '
39D3   032A        lset x$ = mki$(resetimer)
39DF   032A   '
39DF   032A   '    Start timer
39DF   032A   '
39DF   032A        lset y$ = mki$(startimer)
39EB   032A   '
39EB   032A   '
39EB   032A   '    Fourth screen of data
39EB   032A   '
39EB   032A   '
39EB   032A        lset z$ = mki$(digitalout(0))
39F7   032A   '
39F7   032A        lset a0$ = mki$(digitalout(1))
```

```
3A03   032A   '
3A03   032A        lset a1$ = mki$(digitalout(2))
3A0F   032A   '
3A0F   032A        lset a2$ = mki$(digitalout(3))
3A1B   032A   '
3A1B   032A        lset a3$ = mki$(digitalout(4))
3A27   032A   '
3A27   032A        lset a4$ = mki$(digitalout(5))
3A33   032A   '
3A33   032A        lset a5$ = mki$(digitalout(6))
3A3F   032A   '
3A3F   032A        lset a6$ = mki$(digitalout(7))
3A4B   032A   '
3A4B   032A   '
3A4B   032A   '    Put the data up.
3A4B   032A   '
3A4B   032A        put #2, putrecord
3A55   032A        if oldentry = 0 then numsrecs = numsrecs + 1
3A66   032A   '
3A66   032A        return
3A68   032A   '
3A68   032A   25100 '
3A68   032A   '
3A68   032A   '    Get a blank screen entry.....
3A68   032A   '
3A68   032A        putrecord = 0
3A6E   032A   '
3A6E   032A        for i = 2 to totalrecords
3A7A   032C            get #2, i
3A84   032C            temp = cvi(a$)
3A8E   032C            if temp = -1 then putrecord = i: goto 25101
3AA1   032C        next
3AB1   032C   '
3AB1   032C        error1 = 151: return
3AB9   032C   '
3AB9   032C   25101 '
3AB9   032C   '
3AB9   032C        oldhighentry = oldhighentry + 1
3AC0   032C        lset a$ = mki$(oldhighentry)
3ACC   032C   '
3ACC   032C        return
3ACE   032C   '
3ACE   032C   25110 '
3ACE   032C   '
3ACE   032C   '    Get a blank message entry
3ACE   032C   '
3ACE   032C        foundflag = 0
3AD4   032C   '
3AD4   032C        field #3, 39 as message$, 1 as fm$
3AE9   032C   '
3AE9   032C        for i = 1 to 600
3AEF   032C            get #3, i
3AF9   032C            if left$(message$,5) = "@#$%!" then foundflag = i: return
3B15   032C        next
```

```
3B24   032C   '
3B24   032C        errorl =  152
3B2A   032C   '
3B2A   032C        return
3B2C   032C   '
3B2C   032C   25120 '
3B2C   032C   '
3B2C   032C   '    Get a blank name entry
3B2C   032C   '
3B2C   032C        foundflag = 0
3B32   032C   '
3B32   032C        field #4, 8 as nameentry$, 2 as nametype$
3B47   032C        for i = 1 to 200
3B4D   032C            get #4, i
3B57   032C            if left$(nameentry$,5) = "@#$%!" then foundflag = i: return
3B73   032C        next
3B82   032C   '
3B82   032C        errorl = 153
3B88   032C   '
3B88   032C        return
3B8A   032C   '
3B8A   032C   30000 '
3B8A   032C   '
3B8A   032C   '    end
3B8A   032C   '
3B8A   032C        errorl = 61
3B90   032C        gosub 20700
3B94   032C   '
3B94   032C        field #2, 2 as snum$, 2 as entry$, 68 as fs$
3BB1   0330        beginnum = 2
3BB7   0332        for i = 2 to 200
3BBD   0332            get #2, i
3BC7   0332            if cvi(snum$) <> -1 then gosub 30010
3BD9   0332        next
3BE8   0332   '
3BE8   0332   '    Clean-up the rest of the file.
3BE8   0332   '
3BE8   0332        lset snum$ = mki$(-1)
3BF3   0332        for i = beginnum to 200
3BF9   0332            put #2, i
3C03   0332        next
3C12   0332   '
3C12   0332        i = beginnum - 2
3C1A   0332   '
3C1A   0332        lset snum$ = mki$(i)
3C26   0332        lset entry$ = mki$(oldhighentry)
3C32   0332        put #2, i
3C3B   0332   '
3C3B   0332        gosub 32767
3C3F   0332   '
3C3F   0332        return
3C41   0332   '
3C41   0332   30010 '
3C41   0332   '
```

```
3C41  0332  '    Update the screen file.
3C41  0332  '
3C41  0332       put #2, beginnum
3C4B  0332       beginnum = beginnum + 1
3C52  0332  '
3C52  0332       return
3C54  0332  '
3C54  0332  31110 '
3C54  0332  '
3C54  0332  '    Error on opening variable file
3C54  0332  '
3C54  0332       error1 = 51
3C5A  0332       gosub 20700
3C5E  0332  '
3C5E  0332       gosub 32767
3C62  0332  '
3C62  0332  31115 '
3C62  0332  '
3C62  0332  '    Error on opening screen file
3C62  0332  '
3C62  0332       error1 = 53
3C68  0332       gosub 20700
3C6C  0332  '
3C6C  0332       gosub 32767
3C70  0332  '
3C70  0332  31116 '
3C70  0332  '
3C70  0332  '    Error on opening message file
3C70  0332  '
3C70  0332       error1 = 54
3C76  0332       gosub 20700
3C7A  0332  '
3C7A  0332       gosub 32767
3C7E  0332  '
3C7E  0332  31117 '
3C7E  0332  '
3C7E  0332  '    Error on opening screen file
3C7E  0332  '
3C7E  0332       error1 = 55
3C84  0332       gosub 20700
3C88  0332  '
3C88  0332       gosub 32767
3C8C  0332  '
3C8C  0332  31120 '
3C8C  0332  '
3C8C  0332  '    Bad system error
3C8C  0332  '
3C8C  0332       error1 = 52
3C92  0332       gosub 20700
3C96  0332  '
3C96  0332       return
3C98  0332  '
3C98  0332  31300 '
3C98  0332  '
3C98  0332  '    F4 - reset the screen
3C98  0332  '
3C98  0332       error1 = 0
3C9E  0332       fieldptr = 0
3CA4  0332       badinput = 0
3CAA  0332       gosub 17
3CAE  0332       gosub 34
3CB2  0332  '
3CB2  0332       return
3CB4  0332  '
3CB4  0332  31400 '
3CB4  0332  '
3CB4  0332  '    F5 or F6 .
3CB4  0332  '
3CB4  0332       key1 = 10
3CBA  0332  '
3CBA  0332       return
3CBC  0332  '
3CBC  0332  32767 '
3CBC  0332  '
3CBC  0332       close #1
3CC2  0332       close #2
3CC8  0332       close #3
3CCE  0332       close #4
3CD4  0332  '
3CD4  0332       cls
3CD7  0332       run "ENGINEER.EXE"
3CDD  0332  '
3CDD  0332       end
3CE0  0332
58D9  0332

22151 Bytes Available
 2371 Bytes Free

    0 Warning Error(s)
    0 Severe  Error(s)
```

What is claimed is:

1. A general purpose monitoring and alarm system which is customized by a user for a specific application comprising:

a central processing unit, a plurality of sensors polled by said central processing unit to provide output signals representative of sensed variables to said central processing unit, display means connected to and controlled by said central processing unit for displaying a series of screens facilitating the interactive entry of variable definitions and creation of logical groupings of defined variables corresponding to said sensed variables and the states and limits of each of the variables in a group, and alarm means controlled by said central processing unit in response to all the conditions defined by the states and limits of variables in a logical group being true.

2. A monitoring and alarm system as recited in claim 1 wherein said display means further receives user inputs specifying desired alarm responses, and said central processing unit controlling said alarm means to provide said specified desired alarm responses.

3. A monitoring and alarm system as recited in claim 2 wherein said display means further receives user inputs specifying desired control responses when said conditions are true, said system further comprising controller means controlled by said central processing unit for effecting said control responses.

4. A method of customizing a general purpose monitoring and alarm system to a specific application, said monitoring and alarm system having a central processing unit, a plurality of sensors connected to provide outputs to said central processing unit, and display means to receive user inputs, said method being performed by a user interactive program in said central processing unit and comprising the steps of prompting the user for an alarm/action name, after an alarm/action name has been entered using said display means, prompting the user to enter at least one variable name corresponding to one of said sensors and to choose the state or alarm limit of interest, saving the user entered variable names and their corresponding states or alarm limits, and then prompting the user for an alarm action whenever the states and/or alarm limits for the corresponding variable names that were saved are all logically true.

5. The method as recited in claim 4 further comprising the steps of determining the types and placement of sensors for said specific application and connecting said sensors to said application and said central processing unit.

6. The method as recited in claim 4 further comprising the steps of prompting the user to enter at least one control output to occur whenever the states and/or alarm limits for the corresponding variable names that were saved are all logically true, and transforming the user entered data into a record that is entered into an alarm/action file of the central processing unit.

7. The method as recited in claim 6 further comprising the step of determining the type and placement of at least one controller for said specific application and connecting said controller to said application and said central processing unit, said controller being responsive to said control output.

* * * * *